(12) United States Patent
Yishay

(10) Patent No.: US 11,093,534 B2
(45) Date of Patent: Aug. 17, 2021

(54) SYSTEM AND METHOD FOR KEYWORD SEARCHING USING BOTH STATIC AND DYNAMIC DICTIONARIES

(71) Applicant: Verint Systems Ltd., Herzliya Pituach (IL)

(72) Inventor: Yitshak Yishay, Pituach (IL)

(73) Assignee: VERINT SYSTEMS LTD., Pituach (IL)

(*) Notice: Subject to any disclaimer, the term of this patent is extended or adjusted under 35 U.S.C. 154(b) by 0 days.

(21) Appl. No.: 16/587,940

(22) Filed: Sep. 30, 2019

(65) Prior Publication Data

US 2020/0026723 A1 Jan. 23, 2020

Related U.S. Application Data

(63) Continuation of application No. 15/299,735, filed on Oct. 21, 2016, now Pat. No. 10,614,107.

(30) Foreign Application Priority Data

Oct. 22, 2015 (IL) .......................................... 242219

(51) Int. Cl.
*G06F 16/00* (2019.01)
*G06F 16/33* (2019.01)
(52) U.S. Cl.
CPC ................ *G06F 16/3331* (2019.01)
(58) Field of Classification Search
CPC .. G06F 3/04886; G06F 3/0237; G06F 40/274; G06F 16/1744; G06F 3/023;
(Continued)

(56) References Cited

U.S. PATENT DOCUMENTS 4,672,571 A 6/1987 Bass et al.
4,701,851 A 10/1987 Bass et al.
(Continued)

FOREIGN PATENT DOCUMENTS

EP 0989499 3/2000
EP 2104044 9/2009
EP 2437477 4/2012

OTHER PUBLICATIONS

Aho, A., et al., "Efficient String Matching: An Aid to Bibliographic Search," Communication of the ACM, Jun. 1975, vol. 18, No. 6, pp. 333-340.
(Continued)

*Primary Examiner* — Yicun Wu
(74) *Attorney, Agent, or Firm* — ISUS Intellectual Property PLL; Anthony Jason Mirabito

(57) ABSTRACT

An apparatus and techniques for constructing and utilizing a "dynamic dictionary" that is not a compiled dictionary, and therefore does not need to be recompiled in order to be updated. The dynamic dictionary includes respective data structures that represent (i) a management automaton that includes a plurality of management nodes, and (ii) a runtime automaton that is derived from the management automaton and includes a plurality of runtime nodes. The runtime automaton may be used to search input data, such as communication traffic over a network, for keywords of interest, while the management automaton manages the addition of keywords to the dynamic dictionary. Typically, at least two (e.g., exactly two) such dynamic dictionaries are used in combination with a static dictionary.

20 Claims, 8 Drawing Sheets

(58) Field of Classification Search
CPC .. G06F 40/242; G06F 16/3331; G06F 3/0236;
G06F 3/04817; G06F 3/0482; G06F
3/04883; G06F 40/14; G06F 12/04;
16/24578; G06F 16/30; G06F 16/31;
G06F 16/36; G06F 16/9566; G06F 3/018;
G06F 40/123; G06F 40/126; G06F
40/146; G06F 11/263; G06F 16/13; G06F
16/134; G06F 16/183; G06F 16/2255;
G06F 16/2272; G06F 16/235; G06F
16/243; G06F 16/285; G06F 16/313;
G06F 16/316; G06F 16/325; G06F
16/3322; G06F 16/3334; G06F 16/3338;
G06F 16/353; G06F 16/90335; G06F
16/90344; G06F 16/951; G06F 21/33;
G06F 21/6218; G06F 2221/2101; G06F
3/0219; G06F 3/04842; G06F 3/0488;
G06F 40/129; G06F 40/131; G06F
40/137; G06F 40/149; G06F 40/166;
G06F 40/232; G06F 9/4493; G06F 9/54;
G06F 9/547
See application file for complete search history.

(56) References Cited

U.S. PATENT DOCUMENTS

| | | | |
|---|---|---|---|
| 4,706,212 A | 11/1987 | Toma |
| 5,006,849 A | 4/1991 | Baarman et al. |
| 5,014,327 A | 5/1991 | Potter et al. |
| 5,276,741 A | 1/1994 | Aragon |
| 5,410,475 A | 4/1995 | Lu et al. |
| 5,448,474 A | 9/1995 | Zamora |
| 5,623,406 A | 4/1997 | Ichbiah |
| 5,689,442 A | 11/1997 | Swanson et al. |
| 5,748,781 A | 5/1998 | Datta et al. |
| 5,805,911 A | 9/1998 | Miller |
| 5,835,924 A | 11/1998 | Maruyama et al. |
| 5,850,561 A | 12/1998 | Church et al. |
| 6,012,057 A | 1/2000 | Mayer et al. |
| 6,137,911 A | 10/2000 | Zhilyaev |
| 6,185,524 B1 | 2/2001 | Carus et al. |
| 6,240,408 B1 | 5/2001 | Kaufman |
| 6,360,220 B1 | 3/2002 | Forin |
| 6,385,339 B1 | 5/2002 | Yokota et al. |
| 6,404,857 B1 | 6/2002 | Blair et al. |
| 6,449,657 B2 | 9/2002 | Stanback et al. |
| 6,581,063 B1 | 6/2003 | Kirkman |
| 6,597,812 B1 | 7/2003 | Fallon et al. |
| 6,628,777 B1 | 9/2003 | McIllwaine et al. |
| 6,674,447 B1 | 1/2004 | Chiang et al. |
| 6,718,023 B1 | 4/2004 | Zolotov |
| 6,741,992 B1 | 5/2004 | McFadden |
| 6,757,361 B2 | 6/2004 | Blair et al. |
| 6,785,677 B1 | 8/2004 | Fritchman |
| 6,963,425 B1 | 11/2005 | Nair et al. |
| 6,963,871 B1 | 11/2005 | Hermansen et al. |
| 7,043,690 B1 | 5/2006 | Bates et al. |
| 7,058,652 B2 | 6/2006 | Czarnecki et al. |
| 7,134,141 B2 | 11/2006 | Crosbie |
| 7,203,682 B2 | 4/2007 | Balogh |
| 7,216,162 B2 | 5/2007 | Amit et al. |
| 7,225,343 B1 | 5/2007 | Honig et al. |
| 7,233,699 B2 | 6/2007 | Wenzel et al. |
| 7,287,278 B2 | 10/2007 | Liang |
| 7,308,446 B1 | 12/2007 | Panigrahy et al. |
| 7,451,146 B2 | 11/2008 | Boehm |
| 7,453,439 B1 | 11/2008 | Kushler et al. |
| 7,457,404 B1 | 11/2008 | Hession et al. |
| 7,466,816 B2 | 12/2008 | Blair |
| 7,467,202 B2 | 12/2008 | Savchuk |
| RE40,634 E | 2/2009 | Blair et al. |
| 7,587,041 B2 | 9/2009 | Blair |
| 7,877,401 B1 | 1/2011 | Hostetter et al. |
| 7,925,498 B1 | 4/2011 | Baker et al. |
| 7,984,073 B1 * | 7/2011 | Basiago ............ G06F 16/22 707/802 |
| RE43,103 E | 1/2012 | Rozman et al. |
| 8,176,527 B1 | 5/2012 | Njemanze et al. |
| 8,201,245 B2 | 6/2012 | Dewey et al. |
| RE43,528 E | 7/2012 | Rozman et al. |
| RE43,529 E | 7/2012 | Rozman et al. |
| 8,224,761 B1 | 7/2012 | Rockwood |
| 8,327,265 B1 | 12/2012 | Vogel |
| RE43,987 E | 2/2013 | Rozman et al. |
| 8,402,543 B1 | 3/2013 | Ranjan et al. |
| 8,413,244 B1 | 4/2013 | Nachenberg |
| 8,447,588 B2 | 5/2013 | Karttunen |
| 8,499,348 B1 | 7/2013 | Rubin |
| 8,578,493 B1 | 11/2013 | McFadden |
| 8,682,812 B1 | 3/2014 | Ranjan |
| 8,762,948 B1 | 6/2014 | Zaitsev |
| 8,832,036 B2 | 9/2014 | Xu et al. |
| 8,838,951 B1 | 9/2014 | Hicks et al. |
| 8,839,417 B1 | 9/2014 | Jordan |
| 8,850,579 B1 | 9/2014 | Kalinichenko |
| 8,869,268 B1 | 10/2014 | Barger |
| 8,898,063 B1 | 11/2014 | Sykes et al. |
| 9,053,211 B2 | 6/2015 | Goldfarb et al. |
| 9,058,813 B1 | 6/2015 | Blanksteen |
| 9,135,497 B2 | 9/2015 | Cerna et al. |
| 9,230,160 B1 | 1/2016 | Kanter |
| 9,798,714 B2 | 10/2017 | Yishay |
| 2001/0034743 A1 | 10/2001 | Thomas |
| 2002/0016818 A1 | 2/2002 | Kirani et al. |
| 2002/0049742 A1 | 4/2002 | Chan et al. |
| 2002/0077808 A1 | 6/2002 | Liu et al. |
| 2002/0099744 A1 | 7/2002 | Coden et al. |
| 2002/0123882 A1 | 9/2002 | Mohammed |
| 2002/0129140 A1 | 9/2002 | Peled et al. |
| 2002/0163913 A1 | 11/2002 | Oh |
| 2002/0194159 A1 | 12/2002 | Kamath et al. |
| 2003/0061026 A1 | 3/2003 | Umpleby et al. |
| 2003/0097439 A1 | 5/2003 | Strayer et al. |
| 2003/0174891 A1 | 9/2003 | Wenzel et al. |
| 2003/0236783 A1 | 12/2003 | Eminovici |
| 2004/0122661 A1 | 6/2004 | Hawkinson et al. |
| 2004/0179477 A1 | 9/2004 | Lincoln et al. |
| 2004/0210434 A1 | 10/2004 | Wang et al. |
| 2004/0249631 A1 | 12/2004 | Harris |
| 2004/0249809 A1 | 12/2004 | Ramani et al. |
| 2005/0018618 A1 | 1/2005 | Mualem et al. |
| 2005/0080797 A1 | 4/2005 | Short |
| 2005/0108200 A1 | 5/2005 | Meik et al. |
| 2005/0120017 A1 | 6/2005 | Motoki |
| 2005/0251512 A1 | 11/2005 | McCauley et al. |
| 2005/0278309 A1 | 12/2005 | Evans et al. |
| 2006/0036561 A1 | 2/2006 | Aladahalli et al. |
| 2006/0161984 A1 | 7/2006 | Phillips et al. |
| 2006/0259462 A1 | 11/2006 | Timmons |
| 2006/0277190 A1 | 12/2006 | Fox et al. |
| 2007/0043714 A1 | 2/2007 | Stanton et al. |
| 2007/0044060 A1 | 2/2007 | Waller |
| 2007/0047457 A1 | 3/2007 | Harijono et al. |
| 2007/0074131 A1 | 3/2007 | Assadollahi |
| 2007/0129976 A1 | 6/2007 | Hochberg et al. |
| 2007/0159968 A1 | 7/2007 | Cutaia |
| 2007/0180509 A1 | 8/2007 | Swartz et al. |
| 2007/0185859 A1 | 8/2007 | Flowers et al. |
| 2007/0186284 A1 | 8/2007 | McConnell |
| 2007/0192863 A1 | 8/2007 | Kapoor et al. |
| 2007/0226248 A1 | 9/2007 | Darr |
| 2007/0239741 A1 | 10/2007 | Jordahl |
| 2007/0261112 A1 | 11/2007 | Todd et al. |
| 2007/0294768 A1 | 12/2007 | Moskovitch et al. |
| 2008/0010308 A1 | 1/2008 | Erdogan et al. |
| 2008/0014873 A1 | 1/2008 | Krayer et al. |
| 2008/0028463 A1 | 1/2008 | Dagon et al. |
| 2008/0126834 A1 * | 5/2008 | Sankaran ........... G06F 11/1484 714/4.12 |
| 2008/0141376 A1 | 6/2008 | Clausen et al. |
| 2008/0147801 A1 * | 6/2008 | Foti ................. H04L 29/06027 709/206 |

(56) References Cited

U.S. PATENT DOCUMENTS

| | | |
|---|---|---|
| 2008/0162137 A1 | 7/2008 | Saitoh et al. |
| 2008/0178076 A1 | 7/2008 | Kritt et al. |
| 2008/0184371 A1 | 7/2008 | Moskovitch et al. |
| 2008/0196104 A1 | 8/2008 | Tuvell et al. |
| 2008/0201312 A1 | 8/2008 | Posner |
| 2008/0201772 A1 | 8/2008 | Mondaeev |
| 2008/0208850 A1 | 8/2008 | Boyce |
| 2008/0212514 A1 | 9/2008 | Chen |
| 2008/0228748 A1 | 9/2008 | Fairweather |
| 2008/0243484 A1 | 10/2008 | Mohri et al. |
| 2008/0261192 A1 | 10/2008 | Huang et al. |
| 2008/0267403 A1 | 10/2008 | Boult |
| 2008/0285464 A1 | 11/2008 | Katzir |
| 2008/0294656 A1 | 11/2008 | Bhat |
| 2008/0313214 A1 | 12/2008 | Duhig et al. |
| 2008/0319738 A1 | 12/2008 | Liu et al. |
| 2009/0019019 A1 | 1/2009 | Jones et al. |
| 2009/0028143 A1 | 1/2009 | Eswaran et al. |
| 2009/0052454 A1 | 2/2009 | Pourcher et al. |
| 2009/0063151 A1 | 3/2009 | Arrowood et al. |
| 2009/0106842 A1 | 4/2009 | Durie |
| 2009/0150999 A1 | 6/2009 | Dewey et al. |
| 2009/0157673 A1 | 6/2009 | Boyce |
| 2009/0158430 A1 | 6/2009 | Borders |
| 2009/0171936 A1 | 7/2009 | Kirk et al. |
| 2009/0192874 A1 | 7/2009 | Powles et al. |
| 2009/0216760 A1 | 8/2009 | Bennett |
| 2009/0220153 A1 | 9/2009 | Hall et al. |
| 2009/0249484 A1 | 10/2009 | Howard et al. |
| 2009/0282476 A1 | 11/2009 | Nachenberg et al. |
| 2010/0023318 A1 | 1/2010 | Lemoine |
| 2010/0030553 A1 | 2/2010 | Ball |
| 2010/0037314 A1 | 2/2010 | Perdisci |
| 2010/0071065 A1 | 3/2010 | Khan et al. |
| 2010/0100949 A1 | 4/2010 | Sonwane |
| 2010/0111287 A1 | 5/2010 | Xie et al. |
| 2010/0142698 A1 | 6/2010 | Spottiswoode et al. |
| 2010/0250497 A1 | 9/2010 | Redlich et al. |
| 2011/0035211 A1 | 2/2011 | Eden |
| 2011/0043387 A1* | 2/2011 | Abali ............... H03M 7/3088 341/51 |
| 2011/0099620 A1 | 4/2011 | Stavrou et al. |
| 2011/0154497 A1 | 6/2011 | Bailey |
| 2011/0167494 A1 | 7/2011 | Bowen et al. |
| 2011/0196874 A1 | 8/2011 | Ittiachen |
| 2011/0271341 A1 | 11/2011 | Satish et al. |
| 2011/0302653 A1 | 12/2011 | Frantz et al. |
| 2011/0320816 A1 | 12/2011 | Yao et al. |
| 2012/0011153 A1 | 1/2012 | Buchanan et al. |
| 2012/0017281 A1 | 1/2012 | Banerjee |
| 2012/0030195 A1 | 2/2012 | Holt et al. |
| 2012/0053926 A1 | 3/2012 | Satpute |
| 2012/0066312 A1 | 3/2012 | Kandekar et al. |
| 2012/0109923 A1 | 5/2012 | Pasquero |
| 2012/0167221 A1 | 6/2012 | Kang et al. |
| 2012/0174225 A1 | 7/2012 | Shyamsunder et al. |
| 2012/0179694 A1 | 7/2012 | Sciacca et al. |
| 2012/0193424 A1 | 8/2012 | Al-Omari et al. |
| 2012/0203761 A1 | 8/2012 | Biran et al. |
| 2012/0209828 A1 | 8/2012 | Takenaka et al. |
| 2012/0222117 A1 | 8/2012 | Wong et al. |
| 2012/0233215 A1 | 9/2012 | Walker |
| 2012/0239667 A1 | 9/2012 | Vysyaraju et al. |
| 2012/0254210 A1 | 10/2012 | Dhulipala et al. |
| 2012/0296983 A1* | 11/2012 | Boehm ............... H03M 7/3088 709/206 |
| 2012/0304244 A1 | 11/2012 | Xie et al. |
| 2012/0311708 A1 | 12/2012 | Agarwal et al. |
| 2013/0014253 A1 | 1/2013 | Neou |
| 2013/0096917 A1 | 4/2013 | Edgar et al. |
| 2013/0282744 A1 | 10/2013 | Hartman et al. |
| 2013/0333038 A1 | 12/2013 | Chien |
| 2014/0075557 A1 | 3/2014 | Balabine et al. |
| 2014/0195474 A1 | 7/2014 | Anguera |
| 2014/0207917 A1 | 7/2014 | Tock et al. |
| 2014/0212028 A1 | 7/2014 | Ciarcia |
| 2014/0250132 A1 | 9/2014 | Pollak |
| 2014/0298469 A1 | 10/2014 | Marion et al. |
| 2015/0046496 A1 | 2/2015 | Karmarkar et al. |
| 2015/0066963 A1 | 3/2015 | Macek et al. |
| 2015/0135326 A1 | 5/2015 | Bailey, Jr. |
| 2016/0226511 A1* | 8/2016 | Kataoka ............ H03M 7/3084 |

OTHER PUBLICATIONS

Altshuler, Y., et al., "How Many Makes a Crowd? On the Evolution of Learning as a Factor of Community Coverage," LNCS 7227, 2012, pp. 43-52.

Altshuler, Y., et al., "Incremental Learning with Accuracy Prediction of Social and Individual Properties from Mobile-Phone Data," IEEE, 2011, 10 pages.

Altshuler, Y., et al., "Trade-Offs in Social and Behavioral Modeling in Mobile Networks," LNCS 7812, 2013, pp. 412-423.

Argamon, S., et al., "Automatically Profiling the Author of an Anonymous Text," Communication of the ACM, vol. 52, No. 2, Feb. 2009, pp. 119-123.

Argamon, S., et al., "Gender, Genre, and Writing Style in Formal Written Texts," Text & Talk, vol. 23, Issue 3, 2003, 32 pages.

Atkinson, M., et al., "Near Real Time Information Mining in Multilingual News," World Wide Web Conference, Apr. 20-24, 2009, 2 pages.

Bailey, M., et al., "Automated Classification and Analysis of Internet Malware," RAID, 2007, pp. 178-197.

Bayer, U., et al., Scalable, Behavior-Based Malware Clustering, Secure Systems Lab, Technical University, Vienna, 2009, 18 pages.

Bilge, L., et al., "EXPOSURE: Finding Malicious Domains Using Passive DNS Analysis," Feb. 2011, 17 pages.

Cloudshield, Inc., "Lawful Intercept Next-Generation Platform," 2009, 6 pages.

Coffman, T., et al., "Graph-Based Technologies for Intelligence Analysis," CACM, Mar. 2004, 12 pages.

Corney, M., et al. "Gender-Preferential Text Mining of E-mail Discourse," Proceedings of the 18the Annual Computer Security Applications Conference, 2002, 8 pages.

De Vel, O., et al., "Language and Gender Author Cohort Analysis of E-mail for Computer Forensics," Defence Science and Technology Organisation, Australia, 2002, 16 pages.

Dharmapurikar, S., et al., "Fast and Scalable Pattern Matching for Network Intrusion Detection Systems," IEEE Journal on Selected Areas in Communications, Oct. 2006, vol. 24, Issue 10, pp. 1781-1792.

Dietrich, C.J., et al., "CoCoSpot: Clustering and recognizing botnet command and control channels using traffic analysis," 2012, pp. 475-486.

Eagle, N., et al., "Inferring friendship network structure by using mobile phone data," PNAS, vol. 106, No. 36, 2009, pp. 15274-15278.

Eslahi, M., "botAnalytics: Improving HTTP-Based Botnet Detection by Using Network Behavior Analysis system," Dissertation, Faculty of Computer Science and Information Technology, University of Malaya, 2010, 124 pages.

Estival, D., et al., "Author Profiling for English Emails," Proceedings of the 10$^{th}$ Conference of the Pacific Association for Computational Linguistics, 2007, pp. 263-272.

Fisk, M., et al., "Applying Fast String Matching to Intrusion Detection," Los Alamos National Laboratory and University of California San Diego, Jun. 1975, 22 pages.

FoxReplay Analyst, Fox Replay BV, http//www.foxreplay.com, Revision 1.0, Nov. 2007, 5 pages.

FoxReplay Analyst Product Brochure, Fox-IT BV, http//www.foxreplay.com, 2006, 2 pages.

Goldfarb, E., "Mass Link Analysis: Conceptual Analysis," Jun. 24, 2007, Version 1.1, 21 pages.

Goswami, S., et al., "Stylometric Analysis of Bloggers' Age and Gender," Proceedings of the Third International ICWSM Conference, 2009, pp. 214-217.

Gu, G., et al., "BotMiner: Clustering Analysis of Network Traffic for Protocol- and Structure-Independent Botnet Detection," USENIX

(56) References Cited

OTHER PUBLICATIONS

Security Symposium, vol. 5, No. 2, XP61009228, 2008, 16 pages.
Gu, G., et al., "BotSniffer: Detecting Botnet Command and Control Channels in Network Traffic," Proceedings of the 15$^{th}$ Annual Network and Distributed System Security Symposium (NDSS'08), San Diego, California, 2008, 18 pages.
Jacob, G., et al., "JACKSTRAWS: Picking Command and Control Connections from Bot Traffic," Proceedings of the 20$^{th}$ USENIX Security Symposium, San Francisco, 2011, 16 pages.
Lakhina, A., et al., "Mining Anomalies Using Traffic Feature Distributions," SIGCOMM, 2005, pp. 217-228.
Liu, R-T., et al., "A Fast Pattern-Match Engine for Network Processor-based NIDS," Proceedings of the 20$^{th}$ International Conference on Information Technology (ITCC'04), 2006, 23 pages.
Livadas, C., et al., "Using Machine Learning Techniques to Identify Botnet Traffic," In 2$^{nd}$ IEEE LCN Workshop on Network Security (WoNS'2006), 2006, pp. 967-974.
Mohrehkesh, S., et al., "Demographic Prediction of Mobile User from Phone Usage," Proceedings Mobile Data Challenge by Nokia Workshop, Newcastle, United Kingdom, 2012, 4 pages.
Navarro, G., et al., "Flexible Pattern Matching in Strings: Practical On-Line Search Algorithms for Texts and Biological Sequences," Cambridge University Press, 2002, 166 pages.
Netronome SSL Inspector Solution Overview White Paper, "Examining SSL-encrypted Communications," 2010, 8 pages.
Pan, L., "Effective and Efficient Methodologies for Social Network Analysis," Dissertation submitted to faculty of Virginia Polytechnic Institute and State University, Blacksburg, Virginia, Dec. 11, 2007, 148 pages.
Pandiselvam, et al., "A Comparative Study on String Matching Algorithms of Biological Sequences," 2013, five pages.
Rangel, F., et al., "Overview of the Author Profiling Task at PAN 2013," CLEF 2013 Evaluation Labs, 2013, 13 pages.
Rieck, K., et al., "Botzilla: Detecting the 'Phoning Home' of Malicious Software," Proceedings of the ACM Symposium on Applied Computing (SAC), Sierre, Switzerland, 2010, 7 pages.
Rohde & Schwarz GmbH & Co. KG, "ACCESSNET-T, DMX-500 R2, Digital Mobile eXchange," Product Brochure, Secure Communications, Mar. 2000, 4 pages.
Rohde & Schwarz GmbH & Co. KG, "ACCESSNET-T IP," Product Brochure, Secure Communications, Jan. 2000, 4 pages.
Rohde & Schwarz GmbH & Co. KG, "R&S AllAudio Integrated Digital Audio Software," Product Brochure, Radiomonitoring & Radiolocation, Feb. 2000, 12 pages.
Rohde & Schwarz GmbH & Co. KG, "R&S AllAudio Integrierte digitale Audio-Software," Product Brochure, Feb. 2002, 12 pages.
Rohde & Schwarz GmbH & Co. KG, "R&S AMMOS GX425 Software," http://www2.rohde-schwarz.com/en/products/radiomonitoring/Signal_Analysis/GX425, Jul. 30, 2010, 1 page.
Rohde & Schwarz GmbH & Co. KG, "R&S AMMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.
Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.
Rohde & Schwarz GmbH & Co. KG, "Integrated Digital Audio Software R&S AllAudio," Specifications, 2000, 8 pages.
Rohde & Schwarz GmbH & Co. KG, "R&S RA-CM Continuous Monitoring Software," Product Brochure, Radiomonitoring & Radiolocation, Jan. 2001, 16 pages.
Rohde & Schwarz GmbH & Co. KG, "R&S Ramon COMINT/CESM Software," Product Brochure, Radiomonitoring & Radiolocation, Jan. 2000, 22 pages.
Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.
Schulzrinne, H., et al., "RTP: A Transport Protocol for Real-Time Applications," Standards Track, Jul. 2003, 89 pages.
Sheng, L., et al., "A Graph Query Language and Its Query Processing," IEEE, Apr. 1999, pp. 572-581.
Soghoian, C., et al., "Certified Lies: Detecting and Defeating Government Interception Attacks Against SSL," 2010, 19 pages.
Stamatatos, E., "Author identification: Using text sampling to handle the class imbalance problem," Science Direct, Information Processing and Management, vol. 44, 2008, pp. 790-799.
Svenson, P., et al., "Social network analysis and information fusion for anti-terrorism," CIMI, 2006, 8 pages.
Thonnard, O., et al., "Actionable Knowledge Discovery for Threats Intelligence Support Using a Multi-Dimensional Data Mining Methodolgy," 2008 IEEE International Conference on Data Mining Workshops, 2008, pp. 154-163.
Tongaonkar, A., "Fast Pattern-Matching Techniques for Packet Filtering," Stony Brook University, May 2004, 44 pages.
Verint Systems Inc., "Mass Link Analysis: Solution Description," Dec. 2008, 16 pages.
Wang, W., et al., "Breaking Bad: Detecting malicious domains using word segmentation," 2015, 7 pages.
Wang, H., et al., "NetSpy: Automatic Generation of Spyware Signatures for NIDS," Proceedings of the 22$^{nd}$ Annual Computer Security Applications Conference, Miami Beach, Florida, Dec. 2006, ten pages.
Yu, F. et al., "Fast and Memory-Efficient Regular Expression Matching for Deep Packet Inspection," ANCS'06, San Jose, California, Dec. 3-5, 2006, 10 pages.
Yu, F., et al., "Gigabit Rate Packet Pattern-Matching Using TCAM," Proceedings of the 12th IEEE International Conference on Network Protocols (ICNP'04), 2004, 10 pages.
Search Report, dated Sep. 17, 2018, received in connection with IL Patent Application No. 242219.
Search Report and Preliminary Opinion, dated Mar. 24, 2014, received in connection with EP Patent Application No. 13189920.
Search Report and Preliminary Opinion, dated Jan. 15, 2014, received in connection with EP Patent Application No. 13165912.

* cited by examiner

SYSTEM AND METHOD FOR KEYWORD SEARCHING USING BOTH STATIC AND DYNAMIC DICTIONARIES

CROSS-REFERENCE TO RELATED APPLICATIONS

The present application claims priority to U.S. patent application Ser. No. 15/299,735, which claims priority to Israel Patent Application Serial No. 242219 filed Oct. 22, 2015. The contents of both are each incorporated herein by reference in their entireties.

The present application is also related to U.S. patent application Ser. No. 15/299,729, entitled "System and method for maintaining a dynamic dictionary".

FIELD OF THE DISCLOSURE

The present disclosure relates generally to data processing, and particularly to methods and systems for keyword searching, i.e., detecting particular strings in input data.

BACKGROUND OF THE DISCLOSURE

Keyword searching techniques are used in a wide variety of applications. For example, in some applications, communication traffic is analyzed in an attempt to detect keywords that indicate traffic of interest. Some data security systems attempt to detect information that leaks from an organization network by detecting keywords in outgoing traffic. Intrusion detection systems sometimes identify illegitimate intrusion attempts by detecting keywords in traffic.

Various keyword searching techniques are known in the art. For example, Aho and Corasick describe an algorithm for locating occurrences of a finite number of keywords in a string of text, in "Efficient String Matching: An Aid to Bibliographic Search," Communications of the ACM, volume 18, no. 6, June, 1975, pages 333-340, which is incorporated herein by reference. This technique is commonly known as the Aho-Corasick algorithm. As another example, Yu et al. describe a multiple-pattern matching scheme, which uses Ternary Content-Addressable Memory (TCAM), in "Gigabit Rate Packet Pattern-Matching using TCAM," Proceedings of the 12$^{th}$ IEEE International Conference on Network Protocols (ICNP), Berlin, Germany, Oct. 5-8, 2004, pages 174-183, which is incorporated herein by reference.

SUMMARY OF THE DISCLOSURE

There is provided, in accordance with some embodiments described herein, a method for searching input data. One or more newly-arrived keywords are added to a static dictionary, which is represented by a data structure stored in computer memory and needs to be recompiled in order to be updated, by recompiling the static dictionary. During the recompilation of the static dictionary, any keywords that arrive during the recompilation are added to both a first dynamic dictionary and a second dynamic dictionary, each of which is represented by a respective data structure stored in computer memory and does not need to be recompiled in order to be updated. Also during the recompilation of the static dictionary, input data is searched using both the first dynamic dictionary and the static dictionary. Following the recompilation, input data is searched using both the second dynamic dictionary and the static dictionary.

In some embodiments, the method further includes storing the respective data structures that represent the first and second dynamic dictionaries at least partly within a cache memory of a processor.

In some embodiments, storing the respective data structures at least partly within the cache memory of the processor includes:

during the recompilation of the static dictionary, storing the first dynamic dictionary at least partly within the cache memory; and following the recompilation, storing the second dynamic dictionary at least partly within the cache memory.

In some embodiments, the method further includes, following the recompilation, rebuilding the first dynamic dictionary, such that the first dynamic dictionary does not include one or more keywords that the first dynamic dictionary previously included.

In some embodiments, the recompilation is a first recompilation, and the method further includes, following the first recompilation, adding the keywords that arrived during the first recompilation to the static dictionary, by performing a second recompilation of the static dictionary.

In some embodiments, the method further includes, during the second recompilation of the static dictionary:

adding any keywords that arrive during the second recompilation to both the first dynamic dictionary and the second dynamic dictionary, and searching input data using both the second dynamic dictionary and the static dictionary.

In some embodiments, the method further includes adding the newly-arrived keywords to a keyword collection, and recompiling the static dictionary includes recompiling the static dictionary such that the static dictionary includes all keywords contained in the keyword collection at a start of the recompilation.

In some embodiments, the method further includes adding to the second dynamic dictionary, but not to the first dynamic dictionary, any keywords that arrive following the recompilation and prior to a subsequent recompilation.

In some embodiments, the method further includes repeatedly adding at least one respective newly-arrived keyword to the static dictionary, by repeatedly recompiling the static dictionary.

There is further provided, in accordance with some embodiments described herein, apparatus, including:
a network interface; and
one or more processors, configured to:
  add one or more newly-arrived keywords to a static dictionary, which is represented by a data structure stored in computer memory and needs to be recompiled in order to be updated, by recompiling the static dictionary,
  during the recompilation of the static dictionary:
    add to both a first dynamic dictionary and a second dynamic dictionary, each of which is represented by a respective data structure stored in computer memory and does not need to be recompiled in order to be updated, any keywords that arrive during the recompilation, and
    search input data received via the network interface using both the first dynamic dictionary and the static dictionary, and
  following the recompilation, search input data received via the network interface using both the second dynamic dictionary and the static dictionary.

In some embodiments, the processors are further configured to store the respective data structures that represent the first and second dynamic dictionaries at least partly within a cache memory of one of the processors.

In some embodiments, the processors are configured to:
during the recompilation of the static dictionary, store the first dynamic dictionary at least partly within the cache memory, and
following the recompilation, store the second dynamic dictionary at least partly within the cache memory.

In some embodiments, the processors are further configured to, following the recompilation, rebuild the first dynamic dictionary, such that the first dynamic dictionary does not include one or more keywords that the first dynamic dictionary previously included.

In some embodiments, the recompilation is a first recompilation, and the processors are further configured to, following the first recompilation, add the keywords that arrived during the first recompilation to the static dictionary, by performing a second recompilation of the static dictionary.

In some embodiments, the processors are further configured to, during the second recompilation of the static dictionary:
add any keywords that arrive during the second recompilation to the first dynamic dictionary and to the second dynamic dictionary, and
search input data received via the network interface using both the second dynamic dictionary and the static dictionary.

In some embodiments, the processors are configured to add the newly-arrived keywords to a keyword collection, and to recompile the static dictionary such that the static dictionary includes all keywords contained in the keyword collection at a start of the recompilation.

In some embodiments, the processors are further configured to add to the second dynamic dictionary, but not to the first dynamic dictionary, any keywords that arrive following the recompilation and prior to a subsequent recompilation.

In some embodiments, the processors are configured to repeatedly add at least one respective newly-arrived keyword to the static dictionary, by repeatedly recompiling the static dictionary.

There is further provided, in accordance with some embodiments described herein, a computer software product including a tangible non-transitory computer-readable medium in which program instructions are stored. The instructions, when read by one or more processors, cause the processors to add one or more newly-arrived keywords to a static dictionary, which is represented by a data structure stored in computer memory and needs to be recompiled in order to be updated, by recompiling the static dictionary. During the recompilation of the static dictionary, the instructions cause the processors to (i) add to both a first dynamic dictionary and a second dynamic dictionary, each of which is represented by a respective data structure stored in computer memory and does not need to be recompiled in order to be updated, any keywords that arrive during the recompilation, and (ii) search input data using both the first dynamic dictionary and the static dictionary. Following the recompilation, the instructions cause the processors to search input data using both the second dynamic dictionary and the static dictionary.

In some embodiments, the instructions cause the processors to add to the second dynamic dictionary, but not to the first dynamic dictionary, any keywords that arrive following the recompilation and prior to a subsequent recompilation.

There is further provided, in accordance with some embodiments described herein, a method for maintaining and using a dynamic dictionary. Data structures that collectively represent at least one dynamic dictionary of keywords that does not need to be recompiled in order to be updated are stored in computer memory. The data structures include (i) a management automaton that includes a plurality of management nodes, and (ii) a runtime automaton that is derived from the management automaton and includes a plurality of runtime nodes. Input data is searched, using the runtime automaton.

In some embodiments, the runtime nodes are uniformly sized.

In some embodiments, storing the data structures includes storing data structures that collectively represent at least two dynamic dictionaries, each of the dynamic dictionaries including a management automaton and a runtime automaton.

In some embodiments, storing the data structures includes storing the data structures at least partly in a cache memory of a processor.

In some embodiments, storing the data structures at least partly in the cache memory of the processor includes storing the runtime automaton in the cache memory.

In some embodiments, storing the runtime automaton includes storing the runtime automaton in a contiguous portion of computer memory.

In some embodiments, the runtime automaton occupies less space in the computer memory than does the management automaton.

In some embodiments, the management automaton uses an alphabet of nibbles, such that each of the management nodes corresponds to a sequence of nibbles that is a portion of at least one of the keywords.

In some embodiments, at least one of the management nodes corresponds to a sequence of nibbles consisting of an odd number of nibbles.

In some embodiments, the method further includes, upon receiving a new keyword that is not included in the dictionary:
updating the management automaton to include the new keyword, and
based on the update to the management automaton, updating the runtime automaton to include the new keyword.

In some embodiments, updating the management automaton to include the new keyword includes adding one or more new management nodes to the management automaton, each of the new management nodes corresponding to at least a portion of the new keyword.

In some embodiments, the method further includes, for at least one of the new management nodes:
ascertaining that the portion of the new keyword corresponded to by the new management node differs by an appendage of exactly one symbol from a sequence of symbols corresponded to by another one of the management nodes;
in response thereto, identifying the other one of the management nodes as a parent node of the new management node; and
in response thereto, storing, in the parent node, a child pointer to the new management node, the child pointer corresponding to the appended symbol.

In some embodiments, the ascertaining includes ascertaining that the portion of the new keyword corresponded to by the new management node differs by an appendage of exactly one nibble from the sequence of symbols corresponded to by the other one of the management nodes.

In some embodiments, the method further includes storing, in the new management node, a parent pointer to the parent node.

In some embodiments, the method further includes:

identifying another one of the management nodes as a fallback node of a management node selected from the new management nodes, in that the other one of the management nodes corresponds to a sequence of symbols that is a largest suffix of the portion of the new keyword corresponded to by the selected management node; and in response thereto, storing, in the selected management node, a fallback pointer to the fallback node.

In some embodiments, the method further includes:

identifying another one of the management nodes as a fallback node of the parent node, in that the other one of the management nodes corresponds to a sequence of symbols that is a largest suffix of the sequence of symbols corresponded to by the parent node; and ascertaining that the fallback node of the parent node stores a child pointer, corresponding to the appended symbol, that points to a child node of the fallback node of the parent node, and identifying the fallback node of the selected management node includes identifying the fallback node of the selected management node by following the child pointer stored in the fallback node of the parent node.

In some embodiments, identifying the other one of the management nodes as the fallback node of the selected management node includes identifying the other one of the management nodes as the fallback node of the selected management node by following a shortcut pointer that is stored in the parent node and corresponds to the appended symbol.

In some embodiments, storing the child pointer to the new management node in the parent node includes replacing the shortcut pointer with the child pointer to the new management node.

In some embodiments, the method further includes storing, in the fallback node, a friend pointer to the selected management node.

In some embodiments, the method further includes:

ascertaining that the fallback node stores a child pointer to a child node of the fallback node, indicating that a sequence of symbols corresponded to by the child node of the fallback node differs by an appendage of exactly one symbol from the sequence of symbols corresponded to by the fallback node; and in response thereto, storing, in the selected management node, a shortcut pointer to the child node of the fallback node.

In some embodiments, the method further includes storing, in one or more other management nodes, respective fallback pointers that point to a management node selected from the new management nodes, indicating that the selected management node corresponds to a largest suffix of respective sequences of symbols corresponded to by the other management nodes.

In some embodiments, storing the respective fallback pointers in the other management nodes includes:

identifying one or more friend nodes of the parent node pointed to by respective friend pointers stored in the parent node, the friend pointers indicating the parent node corresponds to a largest suffix of respective sequences of symbols corresponded to by the friend nodes of the parent node;

ascertaining that one or more of the friend nodes store respective child pointers corresponding to the appended symbol;

identifying the other management nodes, by following the respective child pointers from the one or more of the friend nodes; and storing, in the other management nodes, the respective fallback pointers to the selected management node.

In some embodiments, the method further includes storing, in one or more other management nodes, respective shortcut pointers that point to the new management node, indicating that the parent node corresponds to a largest suffix of respective sequences corresponded to by the other management nodes.

In some embodiments, storing the respective shortcut pointers in the other management nodes includes:

identifying one or more friend nodes of the parent node pointed to by respective friend pointers stored in the parent node, the friend pointers indicating that the parent node corresponds to a largest suffix of respective sequences of symbols corresponded to by the friend nodes of the parent node; and storing, in each of one or more of the friend nodes, a shortcut pointer, corresponding to the appended symbol, that points to the new management node.

In some embodiments, updating the runtime automaton to include the new keyword includes updating the runtime automaton to include the new keyword while using the runtime automaton to search the input data.

In some embodiments, updating the runtime automaton to include the new keyword includes adding one or more new runtime nodes to the runtime automaton, each of the new runtime nodes corresponding to at least a portion of the new keyword.

In some embodiments, each of the new runtime nodes is derived from a respective one of the management nodes.

In some embodiments, the runtime automaton uses an alphabet of symbols, and the method further includes, for each of the new runtime nodes:

storing, in the new runtime node, a plurality of pointers to one or more of the runtime nodes, the pointers including a respective pointer corresponding to each one of the symbols in the alphabet; and subsequently, storing, in one or more of the runtime nodes, respective pointers to the new runtime node.

In some embodiments, adding the one or more new runtime nodes to the runtime automaton includes:

adding a regular runtime node, corresponding to the keyword, to the runtime automaton; and adding a reporting runtime node, corresponding to the keyword, to the runtime automaton, the reporting runtime node storing a plurality of pointers that point to the regular runtime node.

In some embodiments, the reporting runtime node further stores an index for the new keyword.

In some embodiments, the reporting runtime node stores the index in a location corresponding to a location which, in the regular runtime node, stores a pointer to another runtime node.

In some embodiments, searching the input data includes:

traversing the runtime automaton, until the reporting node is reached; and upon reaching the reporting node, ascertaining that the new keyword is present in the input data, by ascertaining that at least two of the pointers stored in the reporting node are equivalent to one another and do not point to a root node of the runtime automaton.

There is further provided, in accordance with some embodiments described herein, apparatus including a network interface and one or more processors. The processors are configured to store, in computer memory, data structures that collectively represent at least one dynamic dictionary of keywords that does not need to be recompiled in order to be updated, the data structures including (i) a management automaton that includes a plurality of management nodes, and (ii) a runtime automaton that is derived from the management automaton and includes a plurality of runtime nodes. The processors are further configured to search input data received via the network interface, using the runtime automaton.

There is further provided, in accordance with some embodiments described herein, a computer software product including a tangible non-transitory computer-readable medium in which program instructions are stored. The instructions, when read by one or more processors, cause the processors to store, in computer memory, data structures that collectively represent at least one dynamic dictionary of keywords that does not need to be recompiled in order to be updated, the data structures including (i) a management automaton that includes a plurality of management nodes, and (ii) a runtime automaton that is derived from the management automaton and includes a plurality of runtime nodes. The instructions further cause the processors to search input data, using the runtime automaton.

The present disclosure will be more fully understood from the following detailed description of embodiments thereof, taken together with the drawings, in which:

DETAILED DESCRIPTION OF EMBODIMENTS

Overview

Security personnel who monitor communication traffic over a network (e.g., the Internet) may wish to search the traffic for particular keywords that may be indicative of a possible security threat. A dictionary of keywords is typically used for such searches. Some dictionaries are "static dictionaries" that are stored in computer memory as compiled data structures. To add a new keyword to a static dictionary, it is necessary to recompile the dictionary.

While some keywords of interest (e.g., "Trojan horse") may be known a priori, other keywords (e.g., a virus signature identified in a "zero-day attack") may not be known a priori, and therefore, it may be necessary to add such keywords to the dictionary "on the fly." A problem with such additions, in the case of a static dictionary, is that during the recompilation, the communication traffic cannot be searched for the new keyword. Furthermore, some keywords may become irrelevant by the time the recompilation has finished. For example, in some cases, a first subject may transfer a particular file to a server on the network, and subsequently provide a second subject with a Uniform Resource Locator (URL) that points to the file. If the URL is identified as a keyword of interest, it may be necessary to add the URL to the dictionary. However, by the time the recompilation of the dictionary is finished (and hence, the URL has been added to the dictionary), the URL may have become irrelevant.

To address the problems described above, embodiments described herein provide apparatus and techniques for constructing and utilizing a "dynamic dictionary" that is not a compiled dictionary, and therefore does not need to be recompiled in order to be updated. The dynamic dictionary includes respective data structures that represent (i) a management automaton that includes a plurality of management nodes, and (ii) a runtime automaton that is derived from the management automaton and includes a plurality of runtime nodes. The runtime automaton may be used to search input data, such as communication traffic over a network, for keywords of interest, while the management automaton manages the addition of keywords to the dynamic dictionary. Typically, at least two (e.g., exactly two) such dynamic dictionaries are used in combination with a static dictionary, as described in detail hereinbelow.

System Description

Introduction

Figure 1:
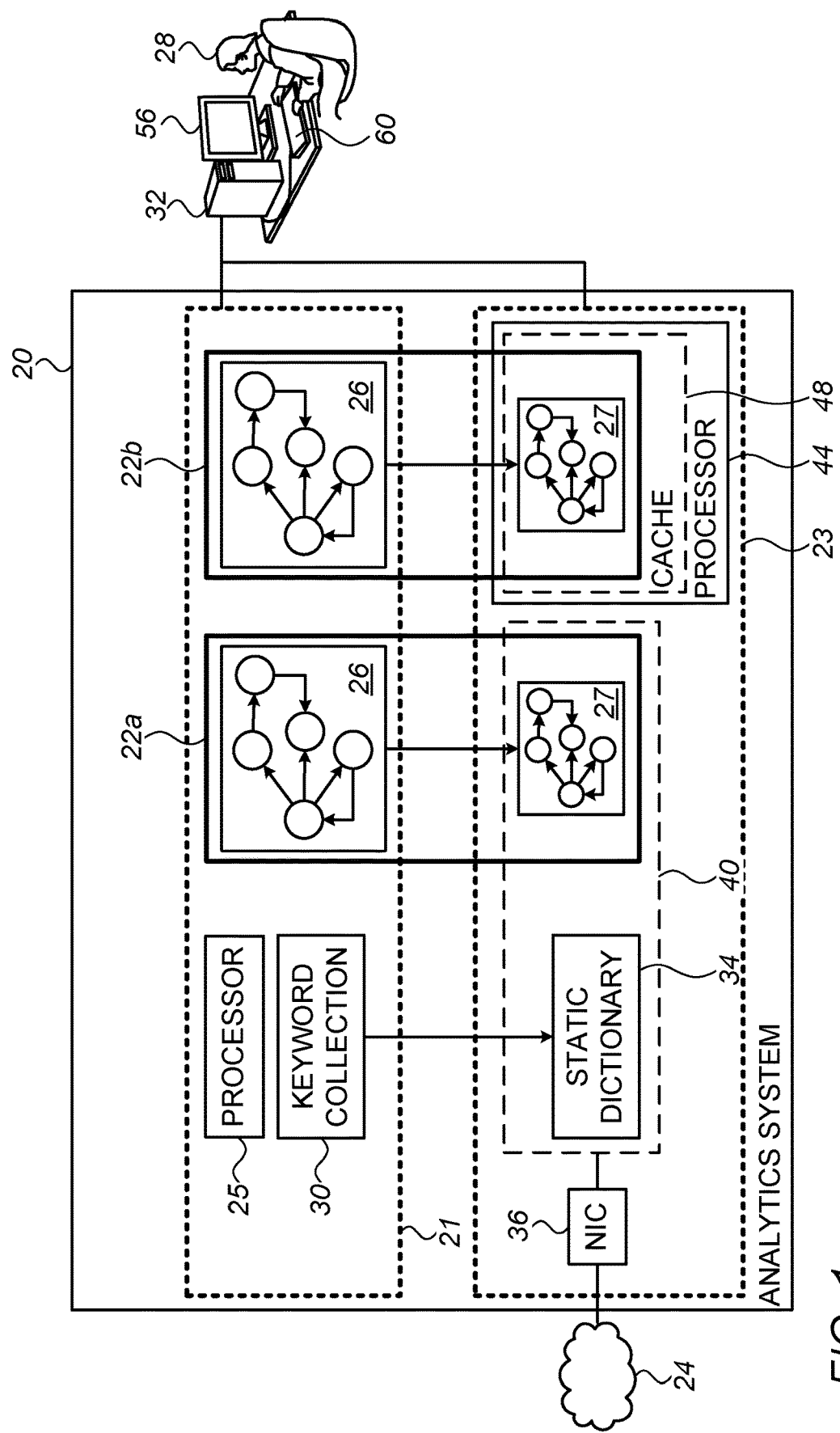
FIG. 1 is a block diagram that schematically illustrates a system for keyword searching, in accordance with some embodiments described herein.

FIG. 1 is a block diagram that schematically illustrates a system 20 for keyword searching, in accordance with some embodiments described herein. System 20 receives communication traffic from a communication network 24, and attempts to detect in the traffic predefined textual phrases, referred to as keywords, drawn from a predefined dictionary. When one or more keywords are detected, the system reports the detection to a user 28 using an operator terminal 32.

System 20 may be used, for example, in security-related monitoring, as described above. Alternatively, system 20 may be used in an application that detects data leakage from a communication network. In applications of this sort, the presence of one or more keywords in a data item indicates that this data item should not be allowed to exit the network. Alternatively, system 20 can be used in any other suitable application in which input data is searched for occurrences of keywords, such as in intrusion detection and prevention systems, detection of spam in electronic mail (e-mail) systems, or detection of inappropriate content using a dictionary of inappropriate words or phrases.

Although the embodiments described herein refer mainly to processing of communication traffic, the disclosed techniques can also be used in other domains. For example, system 20 can be used for locating data of interest on storage devices, such as in forensic disk scanning applications. Certain additional aspects of keyword searching are addressed, for example, in U.S. Pat. No. 9,053,211, entitled "Systems and methods for efficient keyword spotting in communication traffic," which is assigned to the assignee of the present patent applications and whose disclosure is incorporated herein by reference.

Network 24 may comprise any suitable public or private, wireless or wire-line communication network, e.g., a Wide-Area network (WAN) such as the Internet, a Local-Area Network (LAN), a Metropolitan-Area Network (MAN), or a combination of network types. The communication traffic, to be used as input data by system 20, may be provided to the system using any suitable means. For example, the traffic may be forwarded to the system from a network element (e.g., router) in network 24, such as by port tapping or port mirroring. In alternative embodiments, system 20 may be placed in-line in the traffic path. These embodiments are suitable, for example, for data leakage prevention applications, but can also be used in other applications.

Typically, network 24 comprises an Internet Protocol (IP) network, and the communication traffic comprises IP packets. In general, however, the methods and systems described herein can be used with any suitable network and/or packet types. Regardless of protocol, the packets searched by system 20 are referred to herein generally as input data.

In the example of FIG. 1, system 20 comprises a plurality of interconnected computing devices, comprising at least a management computer 21 and a runtime computer 23. Management computer comprises a processor 25, while runtime computer 23 comprises a processor 44. Each of processor 25 and processor 44 is typically a programmed digital computing device comprising a central processing unit (CPU). Program code, including software programs, and/or data are loaded into computer memory for execution and processing by the CPU and results are generated for display, output, transmittal, or storage, as described herein and/or as is known in the art. The program code and/or data may be downloaded to the memory in electronic form, over a network, for example, or it may, alternatively or additionally, be provided and/or stored on non-transitory tangible media, such as magnetic, optical, or electronic memory. Such program code and/or data, when provided to the processor, produce a machine or special-purpose computer, configured to perform the tasks described herein.

In some embodiments, processor 44, and/or processor 25, is embodied as a cooperatively networked or clustered set of processors. Alternatively or additionally, the tasks executed by processor 44, and/or by processor 25, may be executed multithreadedly. For example, as further described hereinbelow, the searching of the input data may be multithreaded.

Many of the processor-performed functions described below may be performed by either one of the processors alone, or cooperatively by both processors. Hence, in many cases, the description below refers generally to "the processor," without specifying either processor 44 or processor 25.

Runtime computer 23 comprises a Network Interface Card (NIC) 36, which receives TCP packets from network 24. NIC 36 stores the incoming TCP packets in a memory 40, typically comprising a Random Access Memory (RAM). Processor 44 searches the TCP packets stored in memory 40 and attempts to identify occurrences of predefined keywords in the packets.

The keywords that processor 44 attempts to find in the input data are included in a system of dictionaries that comprises (i) a static dictionary 34, which needs to be recompiled in order to be updated, and (ii) a first dynamic dictionary 22a and a second dynamic dictionary 22b, each of which is not a compiled dictionary, and therefore does not need to be recompiled in order to be updated. Respective data structures that represent static dictionary 34 and first and second dynamic dictionaries 22a and 22b are stored in the memory of system 20. Typically, each of the dynamic dictionaries is stored as a collection of data structures that includes a management automaton 26, and a runtime automaton 27 that is derived from management automaton 26. In particular, runtime automaton 27 is typically a "slimmed-down" version of management automaton 26, such that the runtime automaton occupies less space in memory than does the management automaton. Processor 44 typically uses the runtime automaton, but not the management automaton, to search the input data. Hence, the runtime automata are stored in the runtime computer, while the management automata are stored in the management computer. (The memory of the management computer is not explicitly shown in FIG. 1.)

Techniques for updating and using the automata in the dynamic dictionaries are described in detail hereinbelow. In some embodiments, to further increase the access speed to the dynamic dictionaries, the management automaton and/or runtime automaton is stored in a respective contiguous portion of memory.

In some embodiments, one or both of the runtime automata, which are typically relatively small, are stored in an internal cache memory 48 of processor 44, while the static dictionary, which is typically larger than the dynamic dictionaries, is stored in memory 40, which is external to the processor. Since, typically, cache memory 48 has a much faster access speed than memory 40, the storing of the dynamic dictionaries in the cache memory facilitates quick and efficient modifications to, and/or usage of, the dynamic dictionaries. As described below, typically only one of the dynamic dictionaries is used at a time for searching; consequently, in some embodiments, only the runtime automaton that is currently being used is stored in the cache, while the other runtime automaton is stored in memory 40.

In some embodiments, processor 44 comprises multi-level cache circuitry, and cache 48 is of an appropriate cache level.

When processor 44 detects a given keyword in a given packet, it reports the detection to user 28 using an output device of terminal 32, such as a display 56. For example, the processor may issue an alert to the user and/or present the data item (e.g., packet or session) in which the keyword or keywords were detected. Alternatively or additionally, processor 44 may take various kinds of actions in response to detecting keywords. For example, in a data leakage or intrusion prevention application, processor 44 may block some or all of the traffic upon detecting a keyword. In some embodiments, the reporting action or other action taken by the processor is also in response to other conditions being satisfied. For example, the processor may report the detection of a particular keyword only if the packet originates from a particular set of IP addresses, or only if a related keyword was spotted nearby.

User 28 may interact with system 20 using an input device of terminal 32, e.g., a keyboard 60. For example, the user may enter or modify the list of keywords stored in a keyword collection 30 of the management computer, which is used to update static dictionary 34.

The configuration shown in FIG. 1 is only one of many possible configurations. For example, for applications in which the volume of input data is relatively large, system 20 may comprise multiple runtime computers, such that, at any given time, each of the runtime computers searches a respective portion of the input data using a respective runtime automaton, the runtime automata being derived from the same management automaton. Alternatively, system 20 may comprise only one computing device comprising a single processor, configured to perform the below-described functions of both management computer 21 and runtime computer 23. Generally, the different elements of system 20 may be carried out using software, hardware or a combination of hardware and software elements.

Typically, keywords arrive at different respective times to processor 25. The keywords may be received, for example, from user 28, or from any other source, e.g., some other source of data communicating over network 24. Upon receiving one or more newly-arrived keywords that are not included in the system of dictionaries, the processor typically adds the newly-arrived keywords to keyword collection 30. Subsequently, processor 44 adds the newly-arrived keywords to the static dictionary by recompiling the static dictionary such that the static dictionary includes all of the keywords that are contained in the keyword collection at the start of the recompilation. (In other words, the static dictionary is effectively recompiled "from scratch" to include all the keywords that have been received thus far.)

In addition to adding the newly-arrived keywords to the static dictionary, the processors add each of the newly-arrived keywords to one or both of the dynamic dictionaries, as described in detail hereinbelow.

As described hereinabove, static dictionary 34 is stored in memory as a compiled data structure. For example, the static dictionary may be represented as a compiled Aho-Corasick automaton. The static dictionary typically allows for faster and more effective searching than do the dynamic dictionaries. For example, in some embodiments, the static dictionary is capable of handling wildcards, whereas the dynamic dictionaries are not. On the other hand, the dynamic dictionaries do not need to be recompiled in order to be updated, whereas the static dictionary does. Hence, each type of dictionary has its own particular advantages. Embodiments described herein synergistically use the static dictionary together with the dynamic dictionaries, such that the dynamic dictionaries complement the static dictionary, and vice versa.

Updating and Using the Static and Dynamic Dictionaries

First, some terminology will hereby be defined, and a general overview will hereby be provided.

(a) A dynamic dictionary is said to be "active" during the time period in which any new keywords that arrive are added to the dynamic dictionary, and the dynamic dictionary is used to search any input data that arrives.

(b) A dynamic dictionary is said to be on "standby" during the time period in which any new keywords that arrive are added to the dynamic dictionary, but the dynamic dictionary is not used to search input data.

(c) A dynamic dictionary is said to be "inactive" during the time period in which it is neither updated nor used for searching.

As further described hereinbelow, each of the dynamic dictionaries transitions cyclically through the active, inactive, and standby states. Upon transitioning to the standby state from the inactive state, a dynamic dictionary is typically treated as if it were empty, such that, effectively, each of the dynamic dictionaries is repeatedly rebuilt from scratch. Hence, neither the first nor second dynamic dictionary is allowed to grow too large, thus facilitating fast and efficient usage of and updates to the dictionaries.

In general, during recompilation of the static dictionary, one of the dynamic dictionaries is active, while the other dynamic dictionary is on standby; hence, the processor adds any keywords that arrive during the recompilation to both of the dynamic dictionaries. Following the recompilation, the active dynamic dictionary becomes inactive, while the standby dictionary become active.

An advantage of adding the newly-arrived keywords to the active dynamic dictionary is that the active dynamic dictionary may then be used to search the input data for the newly-arrived keywords. An advantage of adding the newly-arrived keywords to the standing-by dynamic dictionary is that, following the recompilation, the previously-standing-by (and now active) dynamic dictionary may be used to search for the newly-arrived keywords, which won't be included in the static dictionary until after the end of the next recompilation of the static dictionary.

Figure 2:
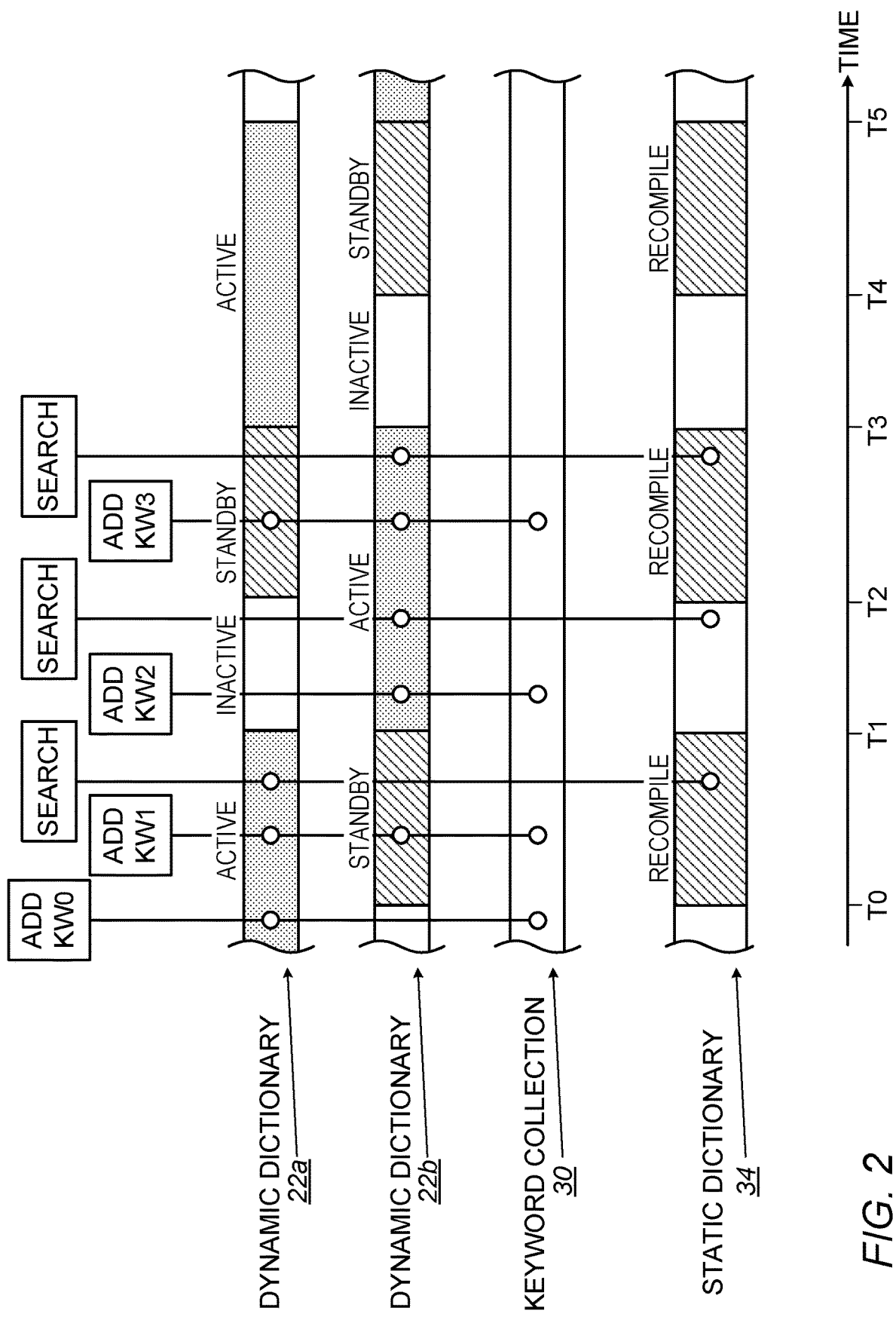
FIG. 2 depicts the updating and usage of the system shown in FIG. 1, in accordance with some embodiments described herein.

Reference is now made to FIG. 2, which depicts the updating and usage of the system shown in FIG. 1, in accordance with some embodiments described herein. The description below will "follow along" the timeline that is shown in the figure, in which time points T0, T1, T2, T3, T4, and T5 are marked.

At T0, the recompiling of static dictionary 34 begins. The static dictionary may be recompiled, for example, in order to add one or more newly-arrived keywords, which were received prior to T0, to the static dictionary. (As described above, the recompilation of the static dictionary may effectively replace the data structure currently stored in memory with a new data structure that includes all of the keywords received thus far.) The new keywords are not actually included in the static dictionary until T1, when the recompilation ends. Between T0 and T1, the static dictionary may be used to search for "old" keywords, but not for any of the new keywords that arrived subsequently to the previous compilation of the static dictionary, whether prior to T0, or between T0 and T1.

For example, FIG. 2 shows a keyword KW0 received prior to T0. Although KW0 is added to the keyword collection prior to T0, KW0 is not included in the static dictionary prior to T1. Likewise, a keyword KW1, received and added to the keyword collection between T0 and T1, is not included in the static dictionary prior to T3 (as described below), and certainly not prior to T1. Hence, prior to T1, the static dictionary cannot be used to search for KW0 or KW1.

To compensate for the above-described issue, the processor adds KW0 and KW1, typically immediately upon receipt, to active first dynamic dictionary 22a, such that the first dynamic dictionary may then be used to search the input data for KW0 and/or KW1 prior to T1. The processor also adds KW1 to standing-by second dynamic dictionary 22b, such that, following T1, the second dynamic dictionary may be used to search for KW1. (There is no need to add KW0 to the second dynamic dictionary, since (i) prior to T1, the first dynamic dictionary may be used to search for KW0, and (ii) after T1, the static dictionary may be used to search to KW0.)

Between T0 and T1, during recompilation of the static dictionary, the active first dynamic dictionary and the static dictionary are both used to search the input data for keywords. The standing-by second dynamic dictionary, on the other hand, is not used for searching between T0 and T1, at least because the second dynamic dictionary does not include any keywords that arrived prior to T0 (e.g., KW0). At T1, the recompilation ends, and the first dynamic dictionary becomes inactive, while the second dynamic dictionary becomes active.

Following the recompilation, any keywords that arrived during the recompilation (e.g., KW1), and/or any keywords that arrive following the recompilation (e.g., keyword KW2, shown in FIG. 2) need to be added to the static dictionary. Hence, the static dictionary needs to be recompiled for a second time. FIG. 2 shows this second recompilation beginning at T2, and continuing until T3.

Between T1 and T2, any keywords that arrive are added to the active second dynamic dictionary, but not to the inactive first dynamic dictionary. For example, FIG. 2 shows keyword KW2 added to the second dynamic dictionary, but not to the first dynamic dictionary. There is no need to add KW2 to the first dynamic dictionary, because (i) prior to T3, the second dynamic dictionary may be used to search for KW2, and (ii) after T3, the static dictionary includes KW2.

At T2, the first dynamic dictionary transitions to the standby state, and is subsequently rebuilt, such that the first dynamic dictionary does not include one or more keywords that the first dynamic dictionary previously included. As noted above, typically, the first dynamic dictionary is rebuilt from scratch, such that the first dynamic dictionary includes only those keywords that arrive subsequently to the transition to the standby state. As noted above, an advantage of rebuilding the first dynamic dictionary is that the first dynamic dictionary is not allowed to grow too large. Furthermore, there is no disadvantage to "losing" the keywords previously included in the first dynamic dictionary, since (i) any keywords received prior to T0 are included in the static dictionary, while (ii) any keywords received between T0 and T1 are included in the second dynamic dictionary.

Between T1 and T3, the active second dynamic dictionary and the static dictionary are both used to search the input data. The inactive or standing-by first dynamic dictionary, on the other hand, is not used to search the input data.

Between T2 and T3, during the second recompilation, any keywords that arrive are added to the first dynamic dictionary and to the second dynamic dictionary. In other words, the second recompilation is treated like the first recompilation, insofar as newly-arrived keywords are added to both of the dynamic dictionaries. However, with regards to searching, the respective statuses of the dynamic dictionaries are interchanged, relative to the first recompilation. In other words, as noted above, during the second recompilation, the processor uses both the second dynamic dictionary and the static dictionary, but not the first dynamic dictionary, to search the input data.

Typically, as shown in FIG. 2, the static dictionary is repeatedly recompiled. For ease of illustration, FIG. 2 shows a somewhat atypical embodiment, in which the static dictionary is recompiled at fixed intervals. Typically, however, the static dictionary is recompiled as soon as at least one newly-arrived keyword is available. For example, with reference to FIG. 2, the processor may recompile the static dictionary at T1 (i.e., immediately following the first recompilation), due to the arrival of KW1 during the first recompilation. Alternatively, the processor may initiate a second recompilation of the static dictionary immediately upon receipt of KW1, before T1. In such embodiments, the beginning portion of the second recompilation may run in parallel with the first recompilation. Upon the end of the second recompilation, the version of the static dictionary that was compiled during the second recompilation replaces the version that was compiled during the first recompilation. (In general, any number of such "parallel recompilations" may be allowed, e.g., up to a predefined limit. The number of dynamic dictionaries may need to be increased, to accommodate such parallel recompilations.) Alternatively or additionally, if certain conditions are met, the first recompilation may be aborted before T1, prior to or immediately following the beginning of the second recompilation.

Typically, when using the static dictionary and one of the dynamic dictionaries to search the input data, the dynamic dictionary is "consulted" first. For example, if the input data includes the string "ABC," processor 44 first determines whether "ABC" is included in the dynamic dictionary, and only subsequently determines whether "ABC" is included in the static dictionary. If, on the other hand, the processor were to consult the static dictionary first, a recognized keyword might not be spotted in the input data, despite the presence of the keyword in the input data. For example, the keyword "ABC" may have been added to first dynamic dictionary 22a only shortly before T1, such that, by the time the processor ascertains that "ABC" is not in the static dictionary, the first dynamic dictionary may already be inactive.

Typically, the processor consults the static dictionary even if a particular string was already determined to be included in the dynamic dictionary, since, in the static dictionary, the particular string may lead to other keywords that are not included in the dynamic dictionary. For example, even if the string "ABC" was already determined to be included in the dynamic dictionary, the processor typically also looks for "ABC" in the static dictionary, since, for example, the keyword "ABCD" may be included in the static dictionary, but not in the dynamic dictionary. Furthermore, the dictionaries may include the same keyword under different respective "contexts." For example, the dynamic dictionary may store an index for the keyword "virus" that refers to a particular computer virus, while the static dictionary may store an index for the same keyword, referring to a particular pathological virus. The searching of both dictionaries for the string "virus" may thus allow the user to be informed of both possible contexts of the spotted keyword "virus."

The Dynamic Dictionary Data Structure

The description below relates to the structure of dynamic dictionaries 22a and 22b. As the two dynamic dictionaries typically use the same data structure, and are typically used and maintained in the same manner, references below to "a dynamic dictionary" or "the dynamic dictionary," in the singular, should be construed as applying to both of the dynamic dictionaries.

Figure 3A:
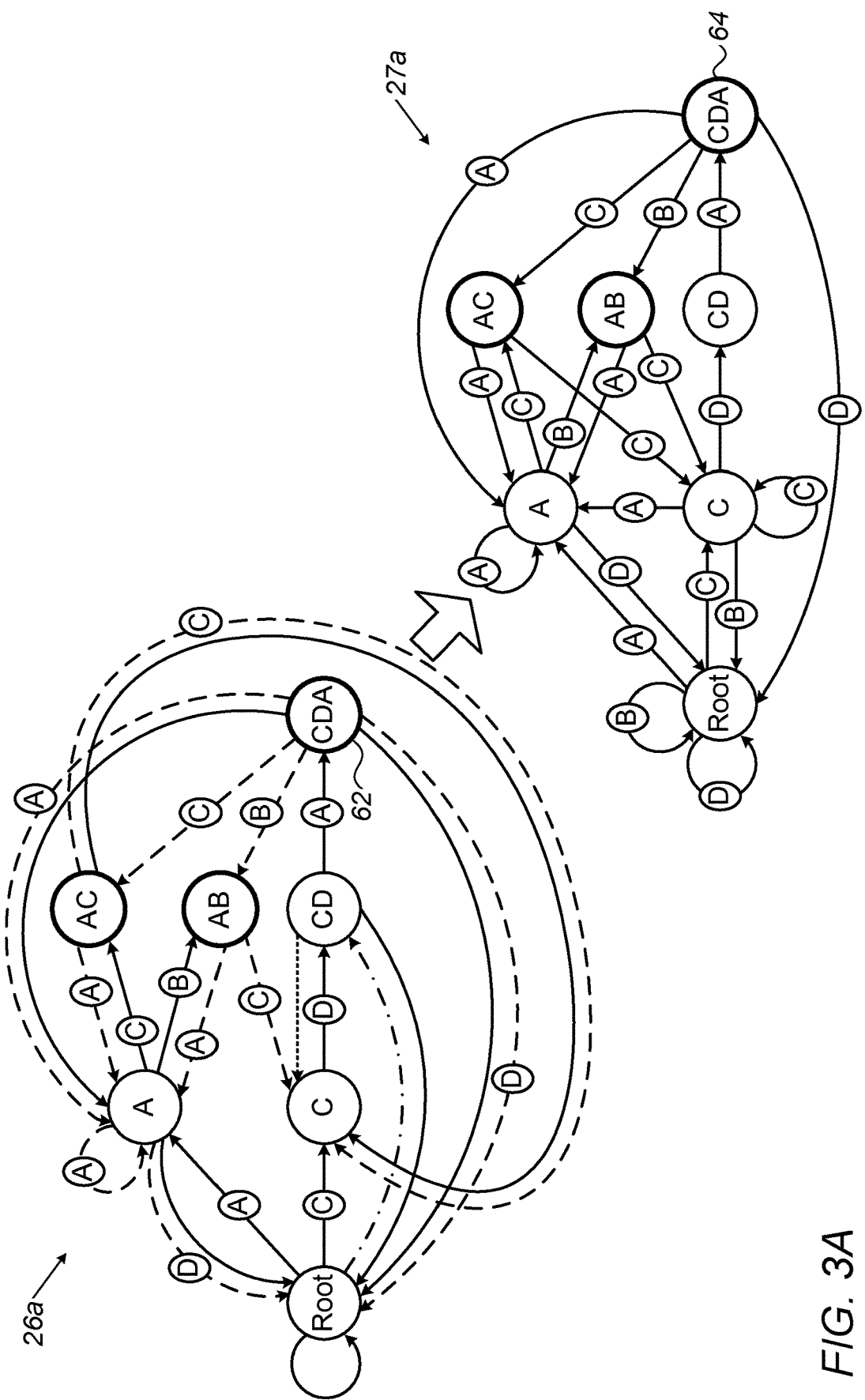
FIG. 3A shows a management automaton and runtime automaton of a dynamic dictionary, in accordance with some embodiments described herein.

Reference is now made to FIG. 3A, which shows a management automaton 26a and a runtime automaton 27a of a dynamic dictionary, in accordance with some embodiments described herein. FIG. 3A, and subsequent figures, assume that the dynamic dictionary uses a simple alphabet consisting of the characters "A," "B," "C," and "D." More precisely, the alphabet may be said to consist of the respective "symbols" representing the characters "A," "B," "C," and "D." For example, the alphabet may consist of the bytes "01000001," "01000010," "01000011," and "01000100," which are the respective American Standard Code for Information Interchange (ASCII) codes for characters "A," "B," "C," and "D." (In other words, each symbol of the alphabet may be a respective byte that represents a respective character.)

As shown in FIG. 3A, management automaton 26a includes a plurality of management nodes 62, each of the management nodes corresponding to a sequence of symbols from the alphabet. (A root management node corresponds to the null sequence.) For ease of description, a node that corresponds to a particular sequence of symbols may be "named" on account of the character, or sequence of characters, represented by the sequence. Thus, for example, the node that corresponds to the sequence "AC" may be referred to below as "the AC node," or "node AC." It is noted that a node typically doesn't store the sequence of symbols to which it corresponds. Hence, the sequence to which a particular node corresponds is typically identified by following the path from the root note to the particular node. In other words, at least for most of the nodes, the topology of the automaton determines the sequence to which the node corresponds.

In the context of the claims and description of the present application, the term "symbol" is to be construed broadly, to include within its scope any meaningful unit of information.

For example, as noted above, the "symbols" of the alphabet of FIG. 3A may be the bytes corresponding to the respective ASCII codes for "A," "B," "C," and "D," such that the nodes in FIG. 3A correspond to respective sequences of bytes. For example, node "A" may correspond to the single-byte sequence "01000001," which is the ASCII code for uppercase "A." Similarly, node "AC" may correspond to the sequence of two bytes "0110000101000011." Alternatively, as further described below with respect to FIG. 6, the "symbols" of the alphabet of FIG. 3A may be the nibbles (i.e., half-bytes), such as the nibbles of the respective ASCII codes.

For simplicity, in the description below, characters may be referred to as "symbols." For example, for simplicity, reference may be made to "symbol 'C'," rather than "symbol '01000011'."

FIG. 3A shows a state in which management automaton 26a includes a "keyword" node for each of the keywords "AC," "AB," and "CDA." (Keyword nodes are indicated in FIG. 3A by a thick circular border.) The management automaton further includes "interim" nodes that lay out respective paths from the root to the keywords, each such interim node storing one or more child pointers that point to respective child nodes of the interim management node. (Child pointers are depicted in the present figures as straight, solid arrows, upon each of which is overlaid the respective symbol to which the pointer corresponds.) For example, with reference to FIG. 3A, the interim node "A" stores (i) a first child pointer, corresponding to the symbol "C," that points to node "AC," and (ii) a second child pointer, corresponding to the symbol "B," that points to node "AB." A keyword management node may also have children; for example, if "ABC" were a keyword, node "AB" would store a child pointer to node "ABC."

Typically, each management node further stores a parent pointer to its parent node. For example, FIG. 3A shows a parent pointer from node "CD" to node "C," as indicated by the broken dotted arrow. For simplicity, most parent pointers are not shown in the present figures.

Each of the management nodes may also store a respective fallback pointer to another, "fallback" management node. (The fallback pointers are depicted in the present figures as curved, solid arrows, upon which no symbols are overlaid.) A node that stores a fallback pointer to the fallback node may be referred to as a "friend" of the fallback node, and may be said to "fall back to" the fallback node. The fallback node corresponds to the largest suffix of the sequence that the friend node corresponds to, relative to the other nodes in the automaton. For example, as shown in FIG. 3A, node "CDA" falls back to node "A," in that "A" is the largest suffix of "CDA" corresponded to by a node in the automaton. (If there were a node "DA" in the automaton, node "CDA" would fall back to node "DA," rather than to node "A.") Nodes that correspond to a single-symbol sequence, and other nodes that do not have another appropriate fallback node (e.g., node "CD" in FIG. 3A), fall back to the root node. For simplicity, only some fallback pointers are shown in the present figures.

Typically, each management node stores a respective friend pointer (depicted in the figures by a dotted-and-dashed arrow) to each of its friend nodes. For example, FIG. 3A shows a friend pointer from the root node to node "CD." For simplicity, most friend pointers are not shown in the present figures. As described below with reference to FIGS. 4A-D, the friend pointers facilitate quick updates to the automaton.

Each of the management nodes typically also stores one or more shortcut pointers. Such shortcut pointers are depicted as dashed arrows in FIG. 3A. (For simplicity, most shortcut pointers are not shown in the present figures.) For example, in FIG. 3A, node "CDA" stores (i) a first shortcut pointer, corresponding to symbol "A," that points to node "A," (ii) a second shortcut pointer, corresponding to symbol "B," that points to node "AB," (iii) a third shortcut pointer, corresponding to symbol "C," that points to node "AC," and (iv) a fourth shortcut pointer, corresponding to symbol "D," that points to the root node. A shortcut pointer is thus named in that, at least in some cases, it "shortens" the path that would otherwise need to be followed to reach the node to which the shortcut pointer points. For example, to reach node "AC" from node "CDA," the shortcut pointer corresponding to "C" may be followed, rather than first following the fallback pointer to node "A" and only subsequently following the child pointer from node "A" to node "AC."

Typically, each management node stores either a child pointer or a shortcut pointer for each of the symbols in the alphabet.

Runtime automaton 27a is derived from management automaton 26a. The runtime automaton includes a plurality of runtime nodes 64. The runtime automaton shown in FIG. 3A differs from management automaton 26a in that the runtime nodes do not store any parent pointers, friend pointers, or fallback pointers. Furthermore, the runtime automaton does not distinguish between child pointers and shortcut pointers. (Hence, all of the arrows in the drawing of the runtime automaton are solid arrows.) Rather, each runtime node simply stores a plurality of pointers corresponding, respectively, to each of the symbols in the alphabet. (In FIG. 3A, for simplicity, not all such pointers are shown.)

Each runtime node is derived from a respective management node, at least in that (i) the sequence to which the runtime node corresponds is the same as the sequence to which the management node corresponds, and/or (ii) each of the pointers stored in the runtime node is derived from a pointer stored in the management node. In the context of the claims and specification of the present application, a runtime pointer is considered to be derived from a management pointer if the runtime pointer points to a runtime node that is derived from the management node to which the management pointer points. For example, with reference to FIG. 3A:

(a) The runtime "A" node is derived from the management "A" node, in that (i) the runtime "A" node also corresponds to the sequence "A," and (ii) each of the pointers stored in the runtime "A" node is derived from either a child pointer or shortcut pointer stored in the management "A" node. For example, the pointer from runtime node "A" corresponding to "C" is derived from the child pointer corresponding to "C" that is stored in management node "A."

(b) The runtime node "CDA" is derived from the management node "CDA," in that (i) the runtime node "CDA" also corresponds to the sequence "CDA," and (ii) each of the pointers stored in the runtime "CDA" node is derived from either a child pointer or shortcut pointer stored in the management "CDA" node. For example, the pointer from runtime node "CDA" corresponding to "A" is derived from the shortcut pointer corresponding to "A" that is stored in management node "CDA."

In general, it is advantageous to maintain both a management automaton and a runtime automaton in the dynamic dictionary, as described herein, rather than maintaining only a single automaton. One reason for this is that in order to update the dynamic dictionary (as described hereinbelow), it is typically necessary to maintain at least some of the "extra" pointers described above—namely, parent pointers, friend pointers, and/or fallback pointers. Hence, if a single automaton were used, the automaton might be too large to fit inside the cache memory of the processor. Conversely, limiting the number and/or type of extra pointers stored by the automaton might reduce the speed at which the automaton is updated.

In embodiments described herein, on the other hand, the management automaton maintains the extra pointers, while the runtime automaton maintains only the pointers that are needed for traversing the automaton. Hence, the management automaton may be used to facilitate quick updates to the dictionary, while the runtime automaton may be small enough to fit inside the cache memory. Furthermore, as further described hereinbelow with reference to FIG. 3B, all of the runtime nodes may be uniformly sized, such that access to the runtime automaton is faster than it would otherwise be. (Usage of a single automaton, on the other hand, might necessitate a non-uniform node size, at least to accommodate the extra pointers.)

Notwithstanding the above, in some embodiments (e.g., for applications in which it is assumed that the number of keywords will be relatively small), the dynamic dictionary may include only a single automaton, similar or identical to the management automaton described herein.

Using the Runtime Automaton for Searching

As noted above, the runtime automaton is typically used for searching the input data. For example, it will be assumed that the input data consists of the input string "CDAC." To search this string for the keywords shown in FIG. 3A, the processor traverses the runtime automaton, beginning at the root note. The first symbol in the input string is "C," such that the pointer from the root node to node "C" is followed. The second symbol in the input string is "D," such that the pointer from node "C" to node "CD" is followed. The third symbol in the input string is "A," such that the pointer from node "CD" to node "CDA" is followed. At this point, the processor reports the spotting of the keyword "CDA" in the input string. The fourth symbol in the input string is "C," such that the pointer from node "CDA" to node "AC" is followed. At this point, the processor additionally reports the spotting of the keyword "AC" in the input string.

In the embodiment shown in FIG. 3A, it is assumed that each runtime node stores an indicator (e.g., a Boolean variable) that indicates whether the node is a keyword node or an interim node. This indicator allows the processor to report the spotting of a keyword, upon reaching a keyword node. Alternatively or additionally, each of the keyword nodes may store an index for the keyword, i.e., an index that refers to the keyword, and/or to particular instructions associated with the keyword, e.g., instructions for reporting and/or taking appropriate action, as described above with reference to FIG. 1.

Figures 3B, 4A:
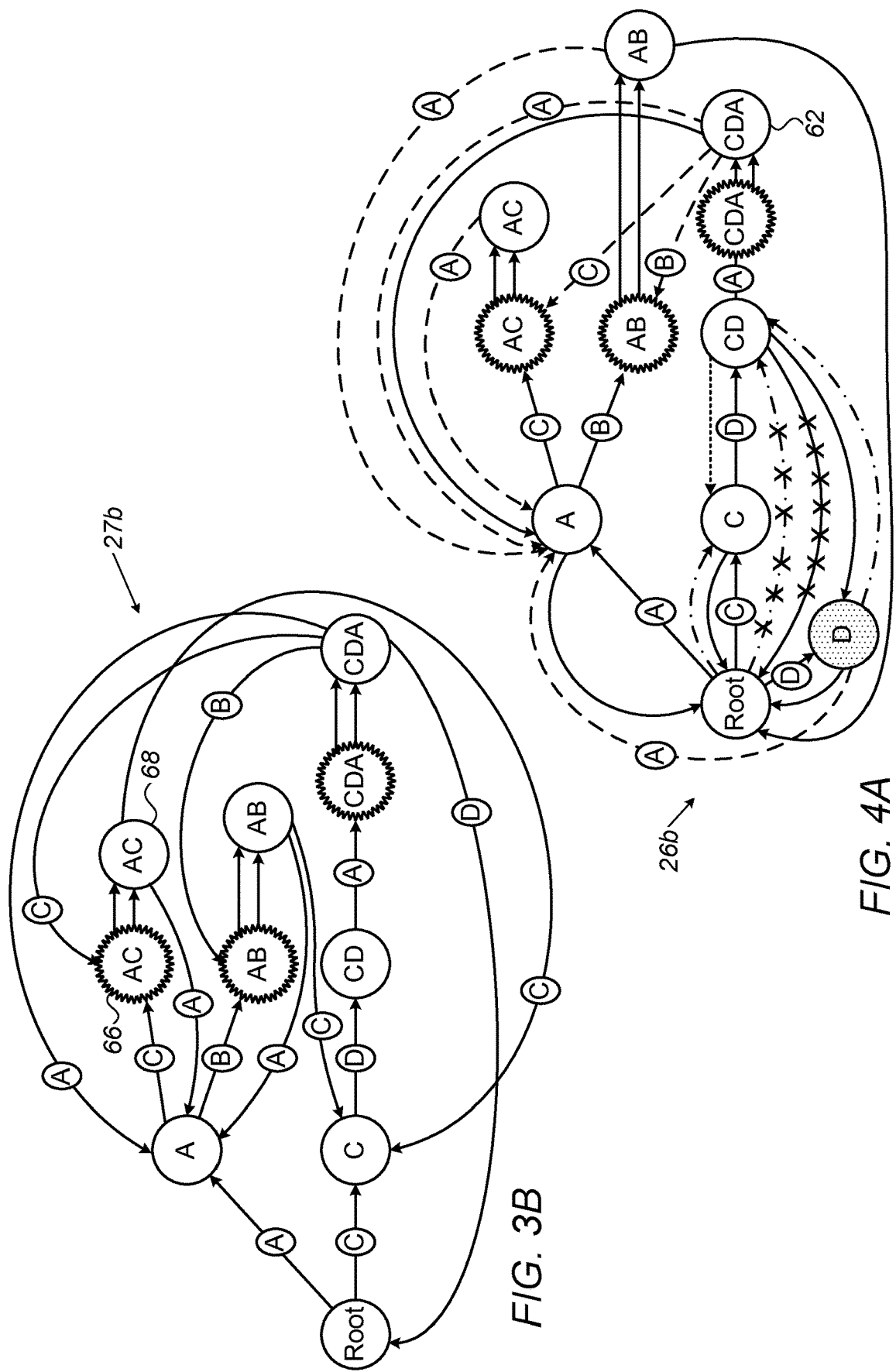
FIG. 3B shows an alternative runtime automaton, in accordance with some embodiments described herein.
FIGS. 4A-D show the updating of a management automaton, in accordance with some embodiments described herein.

Reference is now made to FIG. 3B, which shows an alternative runtime automaton 27b, in accordance with some embodiments described herein. (For simplicity, FIG. 3B omits several of the arrows that are shown in FIG. 3A.) Runtime automaton 27b is equivalent to runtime automaton 27a, except for the following differences:

(a) Each of the keyword runtime nodes in automaton 27a is replaced with (i) a respective reporting node 66, and (ii) a corresponding "regular" runtime node 68. (Reporting nodes are indicated in FIG. 3B by a star-like border.) The reporting node stores a plurality of pointers (e.g., exactly two pointers) to node 68, and no pointers to any other runtime node.

(b) In automaton 27b, all of the runtime nodes—including the reporting nodes—have the same size. (In contrast, in the embodiment of FIG. 3A, each of the keyword nodes may store some additional information, as described above, that is not stored in the interim nodes.) For example, each reporting node may store an index for the keyword in one of the memory locations that is "normally" used for a pointer.

For example, Table 1 below shows an example layout of a portion of memory storing automaton 27b. Each particular node shown in FIG. 3B corresponds to a row in the table, while each of the pointers from the node corresponds to an entry in the row. (Table 1 also includes pointers that are not shown in FIG. 3B.) In particular, the nodes of the automaton are shown as being stored at respective locations in memory, the locations being identified by addresses 0 to 9. Each node stores exactly four integers; thus, the nodes are all of the same size. For each of the non-reporting nodes, each of the integers is a pointer corresponding to a particular one of the symbols of the alphabet. For example, the first integer stored in the root node is a pointer from the root node to node "A," corresponding to symbol "A." Hence, for the root node, Table 1 shows "1," which is the address of node "A," in the column "Pointer A." For each of the reporting nodes, the first two integers are identical pointers to the corresponding regular runtime node, while the fourth integer is the index of the reporting node. For example, for reporting node "AC," Table 1 shows the (arbitrary) index "101" in the column for "Pointer D."

TABLE 1

| Node Location | Node name | Pointer A | Pointer B | Pointer C | Pointer D |
|---|---|---|---|---|---|
| 0 | Root | 1 | 0 | 6 | 0 |
| 1 | A | 1 | 5 | 3 | 0 |
| 2 | AC | 1 | 0 | 6 | 0 |
| 3 | Report AC | 2 | 2 | 0 | 101 |
| 4 | AB | 1 | 0 | 6 | 0 |
| 5 | Report AB | 4 | 4 | 0 | 102 |
| 6 | C | 1 | 0 | 6 | 7 |
| 7 | CD | 9 | 0 | 6 | 0 |
| 8 | CDA | 1 | 5 | 3 | 0 |
| 9 | Report CDA | 8 | 8 | 0 | 103 |

In some cases, e.g., if the size of the index exceeds the amount of memory that is allocated to each of the pointers, an index may be spread over multiple memory locations. For example, with reference to Table 1, part of the index may be stored in the "Pointer C" location, with the rest of the index stored in the "Pointer D" location.

The traversal of runtime automaton 27b proceeds until a reporting node is reached. At that point, the processor ascertains that at least two pointers stored in the reporting node are equivalent to one another, and do not point to the root node (and—in relevant embodiments—also do not point to the parity node, described hereinbelow with reference to FIG. 5). In response thereto, the processor ascertains that the keyword indexed by the index stored in the reporting node is present in the input data, and reports the spotting of the keyword. The processor then proceeds to corresponding regular node 68, and from node 68, proceeds per the next symbol in the input string.

For example, to search the input string "CDAC," the processor traverses runtime automaton 27b, beginning at the runtime root note. The first symbol in the input string is "C," such that the pointer from the root to node "C" is followed. The second symbol in the input string is "D," such that the pointer from node "C" to node "CD" is followed. The third symbol in the input string is "A," such that the pointer from node "CD" to reporting node "CDA" is followed. At this point, the processor ascertains that node "CDA" is a reporting node, and in response thereto, reports the spotting of the keyword "CDA" in the input string. The processor then follows any of the pointers that point to regular node "CDA." The fourth symbol in the input string is "C," such that the processor next follows the pointer from regular node "CDA" to reporting node "AC." At this point, the processor reports the spotting of the keyword "AC" in the input string.

Typically, runtime automaton 27b differs from the management node from which it is derived only in that runtime automaton 27b does not include any of the extra pointers described above. Thus, typically, reporting nodes 66 are also stored in the management automaton from which runtime automaton 27b is derived. For example, FIGS. 4A-D, described immediately hereinbelow, show the updating of a management automaton 26b that is the "source" of the runtime automaton shown in FIG. 3B, i.e., management automaton 26b is parallel to management automaton 26a (FIG. 3A), except for the inclusion of reporting nodes.

Updating the Management Automaton

Typically, each of the automata in the dynamic dictionary supports only updates of accretion. There is typically no need to delete data from the dynamic dictionary, since, as described above with reference to FIG. 2, the dynamic dictionary is in any case continually rebuilt from scratch. Notwithstanding the above, in some embodiments, the automata also support deletions.

Reference is now made to FIGS. 4A-D, which show the updating of management automaton 26b, in accordance with some embodiments described herein. (As described above, management automaton 26b, prior to the updates depicted in FIGS. 4A-D, is parallel to management automaton 26a (FIG. 3A), except for the inclusion of reporting nodes.)

Figure 4B:
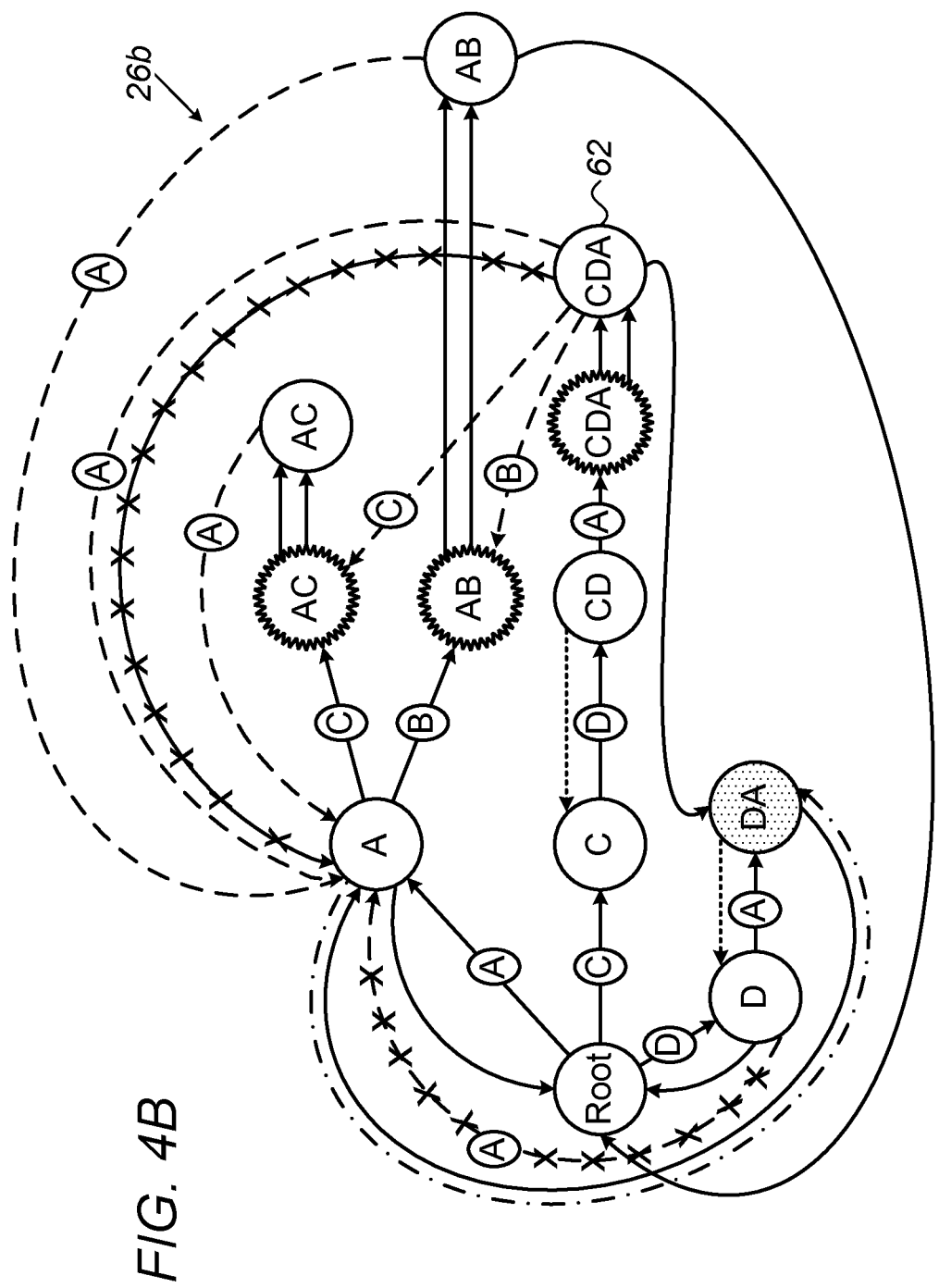
Figure 4C:
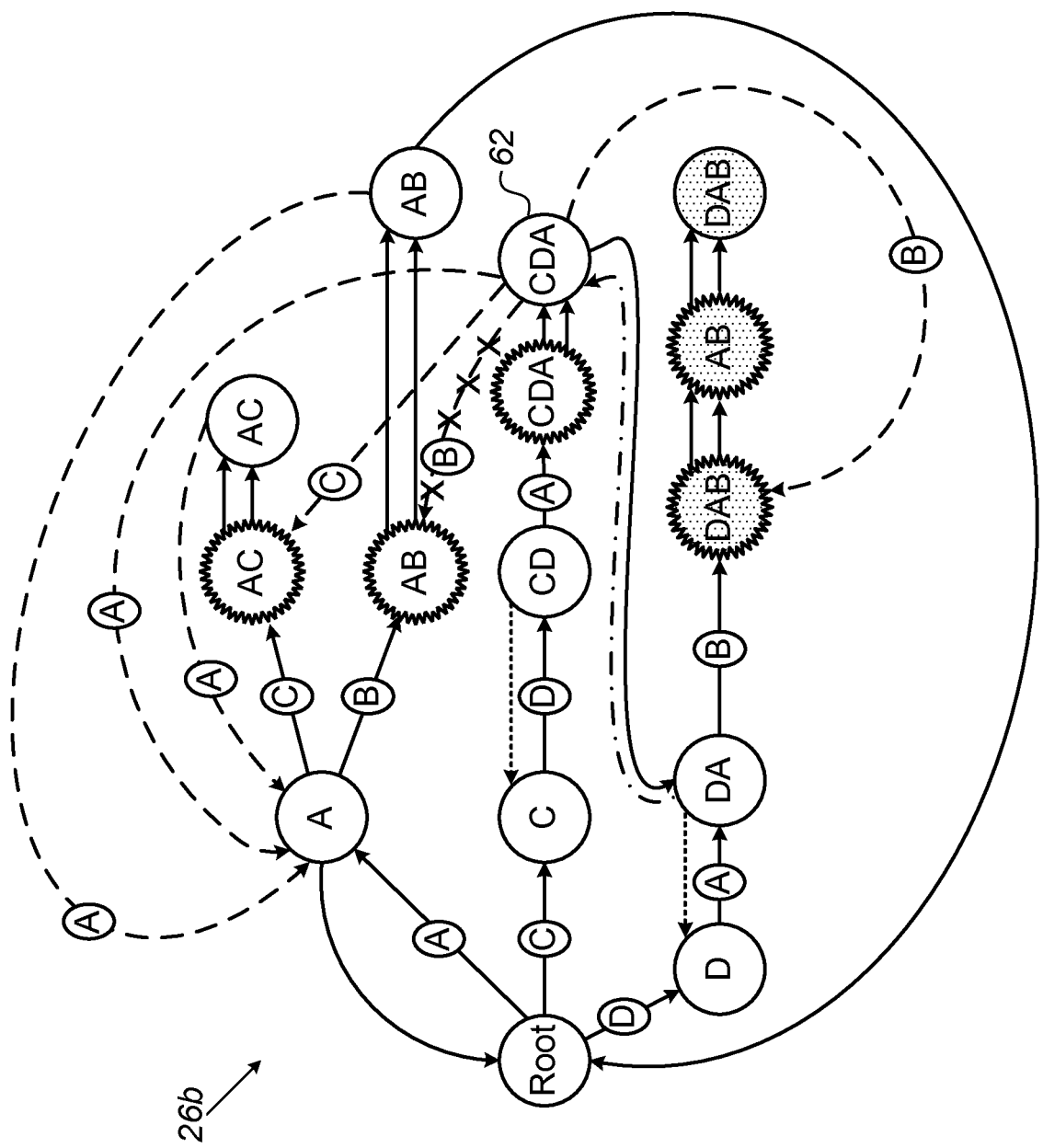
Figure 4D:
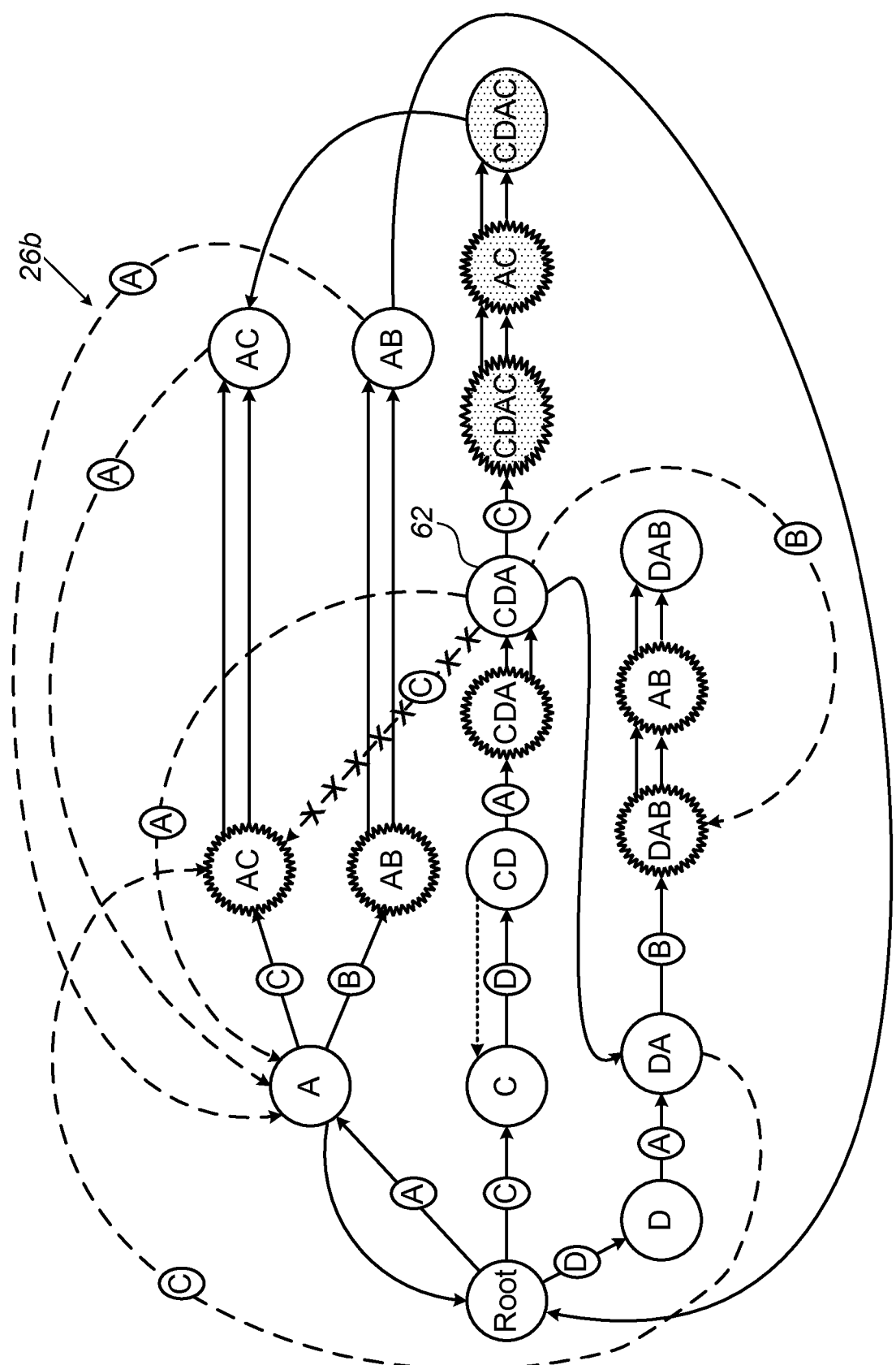

FIGS. 4A-C show the addition of the keyword "DAB" to management automaton 26b, while FIG. 4D shows the subsequent addition of the keyword "CDAC." For simplicity, not all of the arrows shown in FIG. 3A are shown in FIGS. 4A-D. Furthermore, for simplicity, a given later figure of FIGS. 4A-D may omit some of the arrows shown in the earlier figures of FIGS. 4A-D.

In general, adding a keyword to the management automaton comprises adding one or more new management nodes to the management automaton, each of the new management nodes corresponding to at least a portion of the new keyword. In other words, each of the new management nodes corresponds to a portion of the keyword, or to the entire keyword. (A reporting node always corresponds to an entire keyword.)

For example, as shown in FIGS. 4A-C, the keyword "DAB" is added by adding, sequentially, five new nodes to the automaton: a "D" node (FIG. 4A), a "DA" node (FIG. 4B), and finally, a "DAB" node and two associated reporting nodes (FIG. 4C). In each of the figures, for clarity, each of the new nodes added in the figure is shown having a dotted interior.

It is noted that if the new keyword begins a string that is already included in the automaton, only one new management node—a reporting node—is added. For example, upon the arrival of keyword "AB," if the automaton already includes the string "ABC," such that regular node "AB" already exists, the only new management node that is added is a reporting node "AB," between node "A" and regular node "AB."

The addition of a new management node to the management automaton typically comprises at least some of the following steps:

(a) The processor ascertains that the portion of the new keyword to which the new management node corresponds differs by an appendage of exactly one symbol from the sequence of symbols to which another one of the management nodes corresponds. In response thereto, the processor identifies the other one of the management nodes as the parent node of the new management node. In response thereto, the processor stores, in the parent node, a child pointer to the new management node, the child pointer corresponding to the appended symbol.

For example, in FIG. 4B, the processor ascertains that "DA" differs from "D" by the appendage of exactly one symbol ("A"). In response thereto, the processor identifies the "D" node as the parent node of the new "DA" node. In response thereto, the processor replaces the shortcut pointer stored in node "D" corresponding to the symbol "A" with a child pointer, corresponding to the symbol "A," that points to node "DA."

The processor typically also stores, in the new management node, a parent pointer to the parent node. For example, in FIG. 4B, the processor stores a parent pointer to node "D" in the new "DA" node.

It is noted that the new management node may be a reporting node. For example, in FIG. 4C, the processor identifies node "DA" as the parent node of new reporting node "DAB," and therefore stores a child pointer that points to reporting node "DAB" in node "DA." In addition, a parent pointer to node "DA" is typically stored in new reporting node "DAB."

In some embodiments, a new regular node that is preceded by one or more new reporting nodes stores a parent pointer that points to the immediately preceding reporting node. (In such embodiments, the parent node of the new regular node is found by following parent pointers from the regular node until the first regular node is reached.) In other embodiments, the parent pointer stored in the new regular node points directly to the parent of the new regular node. For example, in FIG. 4C, the parent pointer stored in new regular node "DAB" may point to new reporting node "AB," or alternatively, directly to regular node "DA." (In general, it is noted that a reporting node and regular node that correspond to the same sequence are considered to share the same parent. For example, in FIG. 4C, node "DA" is considered to be the parent of both reporting node "DAB" and regular node "DAB," even if the parent pointer stored in regular node "DAB" points to reporting node "AB," rather than directly to node "DA." Similarly, regular node "DAB" may be considered the child node of node "DA," even though the "B" child pointer of node "DA" points only indirectly to node "DAB.")

(b) The processor identifies another one of the management nodes as the fallback node of the new management node. In response thereto, the processor stores, in the new management node, a fallback pointer to the fallback node. For example, in FIG. 4B, the processor identifies the "A" node as the fallback node of the new "DA" node. In response thereto, the processor stores, in the new "DA" node, a fallback pointer to node "A."

The processor typically also stores, in the fallback node, a friend pointer to the new management node. For example, in FIG. 4B, the processor stores a friend pointer to the new "DA" node in the "A" node.

Typically, the processor identifies the fallback node of the new management node by either (i) following an appropriate child pointer or shortcut pointer stored in the fallback node of the parent node of the new node, or (ii) following an appropriate shortcut pointer from the parent node.

In the first embodiment, the processor first ascertains that a fallback pointer to another one of the management nodes is stored in the parent node of the new node. (The processor may identify the parent node of the new node by following the parent pointer from the new node.) In response thereto, the processor identifies the other one of the management nodes as a fallback node of the parent node. The processor then identifies the fallback node of the new node, by following, from the fallback node of the parent node, the pointer that corresponds to the symbol that is appended in the new node.

In the second embodiment, the processor first ascertains that a shortcut pointer, corresponding to the appended symbol, is stored in the parent node and points to another one of the management nodes. In response thereto, the processor identifies the other one of the management nodes as the fallback node of the new node. (As noted above, the shortcut pointer is subsequently replaced with a child pointer to the new node.)

For example:

(i) In FIG. 4B, the processor ascertains that a fallback node to the root node is stored in node "D," which is the parent of new node "DA." In response thereto, the processor identifies the root node as the fallback node of node "D." Since "DA" differs from "D" by the appendage of the symbol "A," the processor next follows, from the root note, the child pointer that corresponds to "A," thus reaching node "A." The processor thus identifies node "A" as the fallback node of new node "DA." Alternatively, the processor follows the shortcut pointer from node "D" to node "A," thus identifying node "A" as the fallback node of new node "DA." (Subsequently, the shortcut pointer from node "D" to node "A" is replaced with a child pointer to new node "DA.")

(ii) In FIG. 4D, the processor ascertains that a fallback node to node "DA" is stored in node "CDA," which is the parent of new node "CDAC." In response thereto, the processor identifies node "DA" as the fallback node of node "CDA." Since "CDAC" differs from "CDA" by the appendage of the symbol "C," the processor next follows, from note "DA," the shortcut pointer that corresponds to "C," arriving at reporting node "AC." The processor thus (a) identifies that a copy of reporting node "AC" should be inserted into the automaton, prior to new regular node "CDAC," in that "CDAC" includes the keyword "AC," and (b) by following the relevant pointers from reporting node "AC," identifies regular node "AC" as the fallback node of new node "CDAC." Alternatively, to arrive at reporting node "AC," the processor follows the shortcut pointer from node "CDA" to node "AC." (Subsequently, the shortcut pointer from node "CDA" to node "AC" is replaced with a child pointer to new reporting node "CDAC.")

Example (ii) above demonstrates that the fallback node of the new management node is not necessarily directly pointed to by the child pointer stored in the fallback node of the parent node, or by the shortcut pointer stored in the parent node. In particular, there may be one or more intervening reporting nodes. For example, as noted above, in FIG. 4D, the parent node of new node "CDAC" is node "CDA," which stores a shortcut pointer, corresponding to "C," that points to reporting node "AC." (Likewise, node "DA," which is the fallback node of node "CDA," stores a child pointer, corresponding to "C," that points to reporting node "AC.") In such cases, the processor follows the child pointer or shortcut pointer to the reporting node, and from the reporting node, follows the relevant pointers to the corresponding regular node. The processor thus identifies the regular node (e.g., regular node "AC" in FIG. 4D) as the fallback node of the new management node.

Example (ii) also demonstrates that during the course of identifying the fallback node of the new management node, the processor may also identify any keywords that are contained in the sequence to which the new management node corresponds. For example, as noted above, during the course of identifying regular node "AC" as the fallback node of new node "CDAC," the processor identifies that "CDAC" contains the keyword "AC," and thus, inserts a reporting node "AC" prior to new node "CDAC." Notwithstanding the above, in some embodiments, the processor identifies the contained keywords only after identifying the fallback node, by following the parent pointer from the identified fallback node. For example, in FIG. 4D, regular node "AC" may store a parent pointer to reporting node "AC." By following this parent pointer to reporting node "AC," the processor identifies that "CDAC" contains the keyword "AC."

(c) The processor ascertains that the fallback node of the new node stores a child pointer to a child node of the fallback node of the new node. (Such a child node may be a reporting node or a regular node.) In response thereto, the processor stores, in the new management node, a shortcut pointer to the child node of the fallback node of the new node. For example, in FIG. 4A, the processor ascertains that the root node, which is the fallback node of new node "D," stores a child pointer to node "A." In response thereto, the processor stores, in new node "D," a shortcut pointer to node "A."

(d) The processor stores, in one or more other nodes, a respective fallback pointer to the new node, indicating that the new node corresponds to the largest suffix of the respective sequences stored in the other nodes. Typically, in performing this operation, the processor changes one or more previously-existing fallback pointers to point to the new node. For example, in FIG. 4A, the processor changes the fallback pointer stored in node "CD" to point to new node "D," rather than to the root node. The processor typically also stores, in the new node, a friend pointer to the other node. For example, in FIG. 4A, the processor stores a friend pointer to node "CD" in new node "D." (The processor also deletes the friend pointer from the root node to node "CD.")

(e) The processor stores, in respective other nodes, one or more shortcut pointers that point to the new node, indicating that the new node is a child node of the fallback node of the other nodes (i.e., the parent node of the new node is the fallback node of the other nodes). Such storing typically comprises changing one or more existing shortcut pointers to point to the new node. For example, in FIG. 4C, the processor changes, in node "CDA," the shortcut pointer corresponding to the symbol "B," which previously pointed to node "AB," to point to the new node "DAB" instead.

It is noted that fallback pointers typically always point to regular nodes, whereas shortcut pointers may point to reporting nodes. Hence, if the new nodes include both a regular node and a reporting node, step (d) will typically involve changing one or more fallback pointers to point to the new regular node, while step (e) will typically involve changing one or more shortcut pointers to point to the new reporting node.

Typically, the processor performs step (d) and/or step (e) by first identifying friend nodes of the parent node of the new node, and determining, for each of the friend nodes, whether the friend node stores a child pointer or shortcut pointer that corresponds to the symbol that is appended by the new node. Subsequently, the processor executes step (d) and/or step (e), as follows:

Step (d): If there is a child pointer corresponding to the appended symbol, the processor follows the child pointer. If the child node of the friend node is a regular node, the processor changes the fallback pointer stored in the child node of the friend node to point to the new node. Otherwise, the processor traverses to the first regular node, and changes the fallback pointer stored in the regular node to point to the new node.

For example, in FIG. 4A, node "C" is a friend node of the root node, which is the parent node of new node "D." Since node "C" stores a child pointer corresponding to symbol "D" (which is the symbol appended by new node "D") that points to node "CD," the processor changes the fallback pointer in node "CD" to point to new node "D."

Likewise, in FIG. 4B, node "CD" is a friend node of node "D," which is the parent node of new node "DA." Node "CD" stores a child pointer corresponding to symbol "A" (which is the symbol appended by new node "DA") that points to reporting node "CDA." The processor follows this child pointer to reporting node "CDA," and then follows the pointers stored in reporting node "CDA" to regular node "CDA." The processor then changes the fallback pointer in regular node "CDA" to point to new node "DA."

Step (e): If there is a shortcut pointer, corresponding to the appended symbol, from the friend node to another node, the processor changes the shortcut pointer to point to the new node. For example, in FIG. 4C, node "CDA" is a friend node of node "DA," which is the parent node of new reporting node "DAB." The processor thus changes the shortcut pointer corresponding to symbol "B" (which is the symbol appended by new node "DAB") to point to new reporting node "DAB."

Typically, steps (d) and (e) are performed recursively, over the various levels of "friends" in the automaton, until all appropriate updates have been made. For example:

Step (d): With reference to FIG. 4D, and supposing that nodes "AC" were added after node CDAC, the processor identifies new regular node "AC" as the fallback node of node "CDAC" by recursively following friend pointers from node "A," the parent of new node "AC." In particular, the processor first identifies node "CDA" as a friend node of node "DA," which is a friend node of node "A," i.e., node "CDA" is a "friend of a friend" of node "A." Since node "CDA" stores a child pointer corresponding to the appended symbol "C," the processor follows the child pointer to node "CDAC," and subsequently changes the fallback pointer in node "CDAC" to point to new regular node "AC."

During the course of performing step (d), the processor may also identify that the sequence to which a particular node corresponds contains a new keyword, and, in response thereto, add a copy of the appropriate reporting node before the particular node. For example, with reference to FIG. 4D, and supposing again that nodes "AC" were added only after node "CDAC," the processor would, upon adding nodes "AC," insert a reporting node "AC" prior to node "CDAC." (The processor may identify the need to insert reporting node "AC" prior to node "CDAC" by following the parent pointer stored in regular node "AC" to reporting node "AC," subsequently to identifying node "AC" as the new fallback node of node "CDAC." Alternatively, the processor may not need to follow the parent pointer from regular node "AC," as the processor already knows that "AC" is a keyword, prior to identifying node "AC" as the new fallback node of node "CDAC.")

Step (e): In FIG. 4C, if there were a node "ACDA," such a node would be a friend node of node "CDA," i.e., it would be a friend of a friend of node "DA," the parent node of new node "DAB." Such a hypothetical node "ACDA" would store a shortcut pointer, corresponding to symbol "B," that points to node "AB." The processor would change this shortcut pointer to point to new reporting node "DAB," instead of to node "AB."

An analogy to help understand steps (d) and (e) is as follows. The "new parent" node "notifies" all of its friends about the "birth" of a child node, this notification including an identifier (e.g., an address in memory) of the new child node, as well as the appended symbol. In response to the notification, each friend node of the "new parent" then modifies one of its shortcut pointers to point to the "newborn" child node, and, if relevant, tells its child node (or a descendant of its child node) to modify a fallback pointer to point to the "newborn" child node, as described above. Each friend node then "passes along the message" to its friend nodes, and so on. (In some embodiments, the implementation of steps (d) and (e) is roughly along the lines of the above analogy, i.e., a type of "notification" is passed between the relevant nodes.)

It is emphasized that the usage of friend pointers for updates, e.g., as described above, increases the speed of the updates, relative to if no friend pointers were used. Typically, due the use of friend pointers, the time required to update the automaton depends mainly on the length of the new keyword, and not on the size of the automaton.

As noted above, in some embodiments, each of the automata may store more than one reporting node corresponding to a given sequence. For example, FIGS. 4C-D show a case in which the management automaton includes both strings "AB" and "DAB." Hence, a reporting node "AB" is included twice—once before node "AB," and once before node "DAB." FIG. 4D also shows this phenomenon for reporting node "AC."

FIGS. 4C-D also illustrate that one reporting node may point to another reporting node, i.e., there may be "chains" of reporting nodes preceding a particular regular node. Alternatively, to reduce the respective sizes of the automata, a reporting node may correspond to multiple keywords, such that no more than one reporting node precedes any given regular node. In such embodiments, a reporting node may store multiple indexes referring to multiple respective keywords, and/or an index may refer to more than one keyword. For example, with reference to Table 1 above:

(i) Multiple indexes may be stored in a single runtime reporting node, by each of the indexes being stored in a respective "pointer location." For example, a single runtime reporting node may precede runtime node "DAB," such a reporting node storing one index for keyword "DAB" in the "Pointer C" location, and another index for keyword "AB" in the "Pointer D" location. (Analogously, multiple indexes may also be stored in a single management reporting node.)

(ii) A single runtime reporting node may precede runtime node "DAB," storing a single index (in one of the pointer locations) that refers to the pair of keywords "DAB" and "AB." (Analogously, a single index in a management reporting node may refer to multiple keywords.)

It is noted that the two alternate embodiments described immediately above are generally consistent with previously-described embodiments, except for the manner in which multiple keywords are reported for a single regular node.

Updating the Runtime Automaton

Typically, following each addition of a management node to the management automaton, a runtime node, derived from the added management node, is added to the runtime automaton. Tables 2-7 show the incremental changes to runtime automaton 27b (FIG. 3B) that occur in response to the changes to management automaton 26b depicted in FIGS. 4A-D. In each of the tables, an asterisked entry indicates that the entry has been changed from the previous table. (The asterisks in Table 2 indicate changes from Table 1, which, as described above, shows the state of runtime automaton in FIG. 3B, prior to the changes of FIGS. 4A-D.) The order in which the changes to memory are made is indicated by the number of asterisks; for example, double-asterisked changes are performed only subsequently to single-asterisked changes.

(i) Table 2 shows changes to runtime automaton 27b in response to the changes shown in FIG. 4A:

TABLE 2

| Node Location | Node name | Pointer A | Pointer B | Pointer C | Pointer D |
|---|---|---|---|---|---|
| 0 | Root | 1 | 0 | 6 | 10** |
| 1 | A | 1 | 5 | 3 | 10** |
| 2 | AC | 1 | 0 | 6 | 10** |
| 3 | Report AC | 2 | 2 | 0 | 101 |
| 4 | AB | 1 | 0 | 6 | 10** |
| 5 | Report AB | 4 | 4 | 0 | 102 |
| 6 | C | 1 | 0 | 6 | 7 |
| 7 | CD | 9 | 0 | 6 | 10** |
| 8 | CDA | 1 | 5 | 3 | 10** |
| 9 | Report CDA | 8 | 8 | 0 | 103 |
| 10 | D | 1* | 0* | 6* | 10* |

Table 2 depicts the addition of node "D." First, pointers from the new node, collectively corresponding to every symbol in the alphabet, are stored in the new node (row 10). Subsequently, the relevant pointers to the new node are stored in the other nodes. Such an order of operations facilitates the updating of the runtime automaton without inhibiting the use of the runtime automaton during the update. In other words, by allowing traversal to the new runtime node only after the new runtime node stores a respective pointer corresponding to each one of the symbols in the alphabet, there is no chance of reaching a "dead end" while traversing the runtime automaton. Furthermore, the changes made to the runtime automaton are typically atomic, such that the processor may multithreadedly modify and/or use the runtime automaton without needing to resort to locks while modifications are made. Hence, typically, updates to the runtime automaton do not reduce the speed or effectiveness of the keyword searching.

(ii) Table 3 shows subsequent changes to runtime automaton 27b, in response to the changes shown in FIG. 4B:

TABLE 3

| Node Location | Node name | Pointer A | Pointer B | Pointer C | Pointer D |
|---|---|---|---|---|---|
| 0 | Root | 1 | 0 | 6 | 10 |
| 1 | A | 1 | 5 | 3 | 10 |
| 2 | AC | 1 | 0 | 6 | 10 |
| 3 | Report AC | 2 | 2 | 0 | 101 |
| 4 | AB | 1 | 0 | 6 | 10 |
| 5 | Report AB | 4 | 4 | 0 | 102 |
| 6 | C | 1 | 0 | 6 | 7 |
| 7 | CD | 9 | 0 | 6 | 10 |
| 8 | CDA | 1 | 5 | 3 | 10 |
| 9 | Report CDA | 8 | 8 | 0 | 103 |
| 10 | D | 11** | 0 | 6 | 10 |
| 11 | DA | 1* | 5* | 3* | 10* |

(iii) Tables 4 and 5 show subsequent changes to runtime automaton 27b, in response to the changes shown in FIG. 4C:

TABLE 4

| Node Location | Node name | Pointer A | Pointer B | Pointer C | Pointer D |
|---|---|---|---|---|---|
| 0 | Root | 1 | 0 | 6 | 10 |
| 1 | A | 1 | 5 | 3 | 10 |
| 2 | AC | 1 | 0 | 6 | 10 |
| 3 | Report AC | 2 | 2 | 0 | 101 |
| 4 | AB | 1 | 0 | 6 | 10 |
| 5 | Report AB | 4 | 4 | 0 | 102 |
| 6 | C | 1 | 0 | 6 | 7 |
| 7 | CD | 9 | 0 | 6 | 10 |
| 8 | CDA | 1 | 13*** | 3 | 10 |
| 9 | Report CDA | 8 | 8 | 0 | 103 |
| 10 | D | 11 | 0 | 6 | 10 |
| 11 | DA | 1 | 13*** | 3 | 10 |
| 12 | DAB | 1* | 0* | 6* | 10* |
| 13 | Report AB | 12** | 12** | 0** | 102** |

TABLE 5

| Node Location | Node name | Pointer A | Pointer B | Pointer C | Pointer D |
|---|---|---|---|---|---|
| 0 | Root | 1 | 0 | 6 | 10 |
| 1 | A | 1 | 5 | 3 | 10 |
| 2 | AC | 1 | 0 | 6 | 10 |
| 3 | Report AC | 2 | 2 | 0 | 101 |
| 4 | AB | 1 | 0 | 6 | 10 |
| 5 | Report AB | 4 | 4 | 0 | 102 |
| 6 | C | 1 | 0 | 6 | 7 |
| 7 | CD | 9 | 0 | 6 | 10 |
| 8 | CDA | 1 | 14** | 3 | 10 |
| 9 | Report CDA | 8 | 8 | 0 | 103 |
| 10 | D | 11 | 0 | 6 | 10 |
| 11 | DA | 1 | 14** | 3 | 10 |
| 12 | DAB | 1 | 0* | 6 | 10 |
| 13 | Report AB | 12 | 12 | 0 | 102 |
| 14 | Report DAB | 13* | 13* | 0* | 104* |

(iv) Tables 6 and 7 show subsequent changes to runtime automaton 27b, in response to the changes shown in FIG. 4D:

TABLE 6

| Node Location | Node name | Pointer A | Pointer B | Pointer C | Pointer D |
|---|---|---|---|---|---|
| 0 | Root | 1 | 0 | 6 | 10 |
| 1 | A | 1 | 5 | 3 | 10 |
| 2 | AC | 1 | 0 | 6 | 10 |
| 3 | Report AC | 2 | 2 | 0 | 101 |
| 4 | AB | 1 | 0 | 6 | 10 |
| 5 | Report AB | 4 | 4 | 0 | 102 |
| 6 | C | 1 | 0 | 6 | 7 |
| 7 | CD | 9 | 0 | 6 | 10 |
| 8 | CDA | 1 | 14 | 16*** | 10 |
| 9 | Report CDA | 8 | 8 | 0 | 103 |
| 10 | D | 11 | 0 | 6 | 10 |
| 11 | DA | 1 | 14 | 3 | 10 |
| 12 | DAB | 1 | 0 | 6 | 10 |
| 13 | Report AB | 12 | 12 | 0 | 102 |
| 14 | Report DAB | 13 | 13 | 0 | 104 |
| 15 | CDAC | 1* | 0* | 6* | 7* |
| 16 | Report AC | 15** | 15** | 0** | 101** |

| Node Location | Node name | Pointer A | Pointer B | Pointer C | Pointer D |
|---|---|---|---|---|---|
| 0 | Root | 1 | 0 | 6 | 10 |
| 1 | A | 1 | 5 | 3 | 10 |
| 2 | AC | 1 | 0 | 6 | 10 |
| 3 | Report AC | 2 | 2 | 0 | 101 |
| 4 | AB | 1 | 0 | 6 | 10 |
| 5 | Report AB | 4 | 4 | 0 | 102 |
| 6 | C | 1 | 0 | 6 | 7 |
| 7 | CD | 9 | 0 | 6 | 10 |
| 8 | CDA | 1 | 14 | 17*** | 10 |
| 9 | Report CDA | 8 | 8 | 0 | 103 |
| 10 | D | 11 | 0 | 6 | 10 |
| 11 | DA | 1 | 14 | 3 | 10 |
| 12 | DAB | 1 | 0 | 6 | 10 |
| 13 | Report AB | 12 | 12 | 0 | 102 |
| 14 | Report DAB | 13 | 13 | 0 | 104 |
| 15 | CDAC | 1 | 0 | 6 | 7 |
| 16 | Report AC | 15 | 15 | 0 | 101 |
| 17 | Report CDAC | 16* | 16* | 0* | 105* |

Nibble-Based Embodiments

Figure 5:
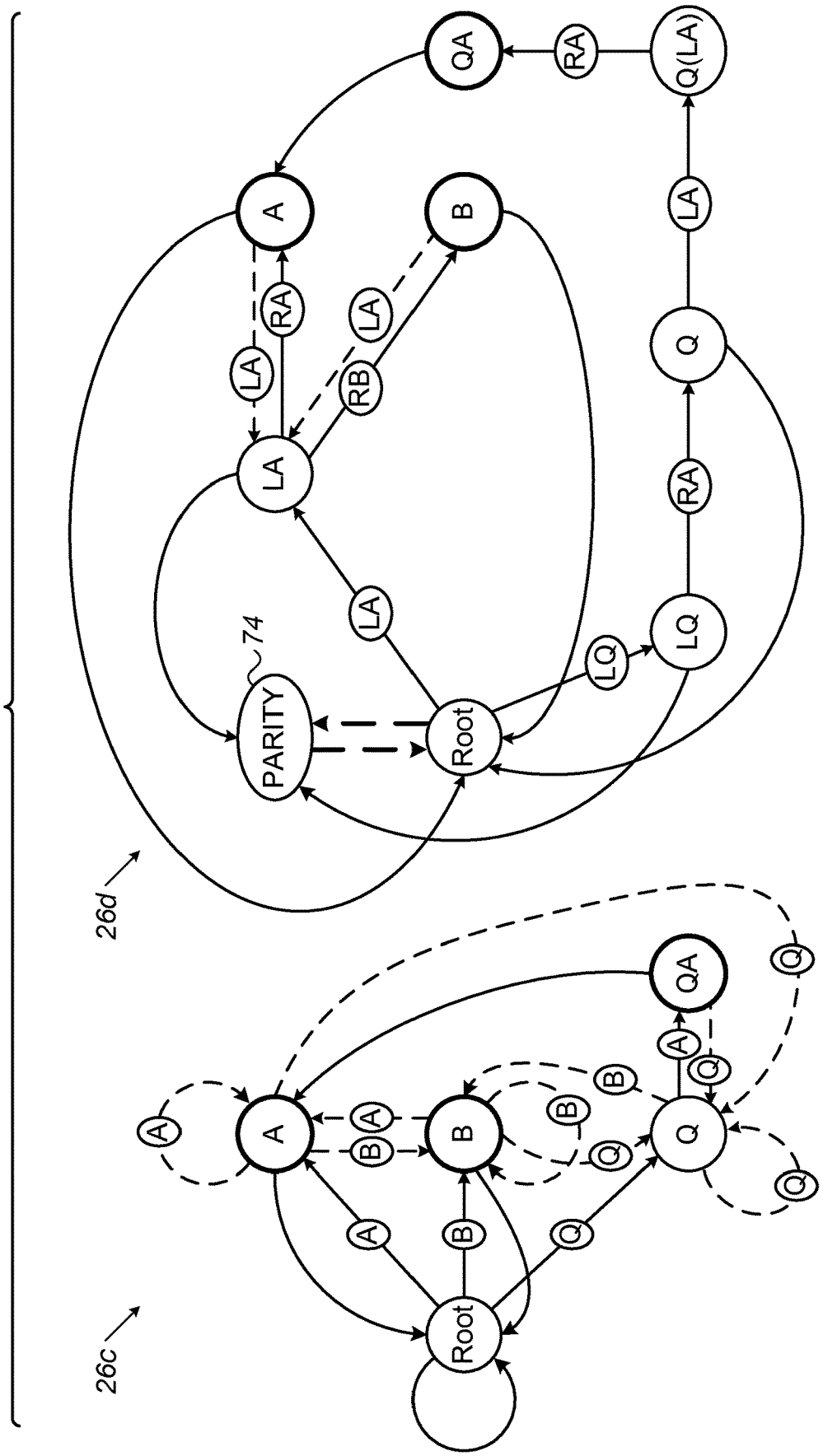
FIG. 5 shows parallel management automata, in accordance with some embodiments described herein.

Reference is now made to FIG. 5, which shows parallel management automata 26c and 26d, in accordance with some embodiments described herein. Although FIG. 5 shows the "interim node and keyword node" scheme described above with reference to FIG. 3A, it is noted that the alternate "reporting node" scheme described above with reference to FIG. 3B FIGS. 4A-D may be used in combination with embodiments shown in FIG. 5, mutatis mutandis. (Hence, the below description of FIG. 5 refers, where appropriate, to reporting nodes, even though such nodes are not shown in FIG. 5.)

Management automaton 26c, which uses an alphabet of bytes, includes three keywords, "A," "B," and "QA." Management automaton 26d includes the same three keywords, but represents the keywords differently from the way in which management automaton 26c represents the keywords.

In particular, management automaton 26d uses an alphabet of symbols that are nibbles (half-bytes), rather than bytes.

In such nibble-based embodiments, it is typically the case that at least one node corresponds to a sequence consisting of an odd number of nibbles. For example, management automaton 26d includes respective nodes corresponding to (i) the symbol "LA," which is the left nibble of "A," (ii) the symbol "LQ," which is the left nibble of "Q," and (iii) "Q(LA)," which is the sequence consisting of the byte "Q" followed by the left nibble of "A."

Likewise, the pointers in management automaton 26d correspond to respective nibbles, rather than to respective bytes. For example, second management automaton 26d includes respective pointers corresponding to (i) the symbol "LA," which is the left nibble of "A," (ii) the symbol "RA," which is the right nibble of "A," and (iii) the symbol "RB," which is the right nibble of "B."

FIG. 5 assumes use of the ASCII code, such that "LA," which is "0100," is also the left nibble of "B." (Hence, there is no "LB" node.) Similarly, "RA," which is "0001," is also the right nibble of "Q."

Some other particular features of management automaton 26d are as follows:

(i) A node corresponding to an even number of nibbles falls back to another node that corresponds to an even number of nibbles, or to the root node. Conversely, a node corresponding to an odd number of nibbles falls back to another node that corresponds to an odd number of nibbles, or to a parity node 74. Falling back to parity node 74, instead of to the root node, prevents the misinterpretation of a "right nibble" as a "left nibble."

(ii) The child pointers and shortcut pointers stored in a particular node point to respective other nodes having the opposite parity. For example, the child pointer corresponding to the symbol "RA" points from the odd-parity node "LA" to the even-parity node "A." (The root node is considered to have even parity, while the parity node is considered to have odd parity.)

(iii) As indicated by the thickened shortcut arrows in FIG. 5, the root node stores a respective shortcut pointer to parity node 74 for each symbol for which the root node does not store a child pointer, and the parity node stores a respective shortcut pointer to the root node for each symbol in the alphabet.

An advantage of using an alphabet of nibble-symbols is that each node may store fewer pointers than might otherwise be necessary, and hence, each node may have a smaller size than in non-nibble-based embodiments. Even though the number of nodes may be greater than would otherwise be the case, the reduction in node size typically more than compensates for the increase in number of nodes. Hence, in nibble-based embodiments, the automata are typically smaller than in non-nibble-based embodiments, such that the runtime automaton is more likely to fit in processor cache 48 (FIG. 1).

For example, for an alphabet of byte-symbols, each runtime node may need to store up to $2^8=256$ pointers. (For example, each runtime node may store exactly 256 pointers.) On the other hand, for an alphabet of nibble-symbols, each runtime node need not store more than $2^4=16$ pointers. (For example, each runtime node may store exactly 16 pointers.) Hence, even if the number of nodes in a nibble-based runtime automaton were to be double the number of nodes in the parallel byte-based runtime automaton, the nibble-based runtime automaton would still be approximately eight times smaller than the parallel byte-based runtime automaton. (Moreover, the number of nodes in the nibble-based automaton is typically less than twice the number of nodes in the parallel byte-based automaton.)

It is emphasized that methods relating to the use of a static dictionary in combination with dynamic dictionaries, as described above with reference to FIG. 2, may be practiced even independently of the embodiments described with reference to subsequent figures. In other words, any type of dynamic dictionary may be used in combination with the static dictionary. Conversely, the dynamic dictionary embodiments described herein may be used "standalone," i.e., even without all of the elements shown in FIGS. 1-2. For example, in cases where only a small number of keywords are expected, a single dynamic dictionary may be used, without using a static dictionary.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method of analyzing communication traffic in a network to determine if keywords occur in the communication traffic, comprising:
   during a recompilation of a static dictionary, wherein the static dictionary is represented by a data structure stored in computer memory:
      receiving one or more keywords during the recompilation;
      in response to beginning the recompilation of the static dictionary, transitioning a first dynamic dictionary to an active state from an inactive state and a second dynamic dictionary to a standby state from the active state, wherein each dynamic dictionary is represented by a respective data structure stored in the computer memory;
      adding the one or more keywords to both the first dynamic dictionary and the second dynamic dictionary; and
      searching input data using both the first dynamic dictionary and the static dictionary and not using the second dynamic dictionary while the first dynamic dictionary is in the active state and the second dynamic dictionary is in the standby state; and
   following the recompilation:
      in response to ending the recompilation of the static dictionary, transitioning the second dynamic dictionary to the active state from the standby state and the first dynamic dictionary to the inactive state from the active state; and
      searching input data using both the second dynamic dictionary and the static dictionary and not using the first dynamic dictionary while the first dynamic dictionary is in the inactive state and the second dynamic dictionary is in the active state.

2. The method according to claim 1, further comprising storing the respective data structures that represent the first and second dynamic dictionaries at least partly within a cache memory of a processor.

3. The method according to claim 2, wherein storing the respective data structures at least partly within the cache memory of the processor comprises:
   during the recompilation of the static dictionary, storing the first dynamic dictionary at least partly within the cache memory while storing the second dynamic dictionary in computer memory; and
   following the recompilation, storing the second dynamic dictionary at least partly within the cache memory while storing the first dynamic dictionary in computer memory.

4. The method according to claim 1, further comprising, following the recompilation, rebuilding the first dynamic dictionary, such that the first dynamic dictionary includes fewer keywords than that the first dynamic dictionary previously included.

5. The method according to claim 1, wherein the recompilation is a first recompilation, and wherein the method further comprises, following the first recompilation, adding the keywords that were received during the first recompilation to the static dictionary, by performing a second recompilation of the static dictionary.

6. The method according to claim 5, further comprising, during the second recompilation of the static dictionary:
   adding any keywords that arrive during the second recompilation to both the first dynamic dictionary and the second dynamic dictionary; and
   searching input data using both the second dynamic dictionary and the static dictionary.

7. The method according to claim 1, further comprising adding the keywords to a keyword collection, wherein recompiling the static dictionary comprises recompiling the static dictionary such that the static dictionary includes all keywords contained in the keyword collection at a start of the recompilation.

8. The method according to claim 1, further comprising adding to the second dynamic dictionary, but not to the first dynamic dictionary, any keywords that arrive following the recompilation and prior to a subsequent recompilation.

9. The method according to claim 1, further comprising repeatedly adding at least one respective newly-arrived keyword to the static dictionary, by repeatedly recompiling the static dictionary.

10. Apparatus, comprising:
    a network interface; and
    one or more processors, configured to analyze communication traffic in a network to determine if keywords occur in the communication traffic and to:
       during the recompilation of a static dictionary, wherein the static dictionary, which is represented by a data structure stored in computer memory:
          receive one or more keywords during the recompilation;
          in response to beginning the recompilation of the static dictionary, transition a first dynamic dictionary to an active state from an inactive state and a second dynamic dictionary to a standby state from the active state, wherein each dynamic dictionary is represented by a respective data structure stored in the computer memory;
          add the one or more keywords to both the first dynamic dictionary and the second dynamic dictionary; and
          search input data received via the network interface using both the first dynamic dictionary and the static dictionary and not using the second dynamic dictionary while the first dynamic dictionary is in the active state and the second dynamic dictionary is in the standby state; and following the recompilation:
- in response to ending the recompilation of the static dictionary, transition the second dynamic dictionary to the active state from the standby state and the first dynamic dictionary to the inactive state from the active state; and
- search input data received via the network interface using both the second dynamic dictionary and the static dictionary and not using the first dynamic dictionary while the first dynamic dictionary is in the inactive state and the second dynamic dictionary is in the active state.

11. The apparatus according to claim 10, wherein the processors are further configured to store the respective data structures that represent the first and second dynamic dictionaries at least partly within a cache memory of one of the processors.

12. The apparatus according to claim 11, wherein the processors are configured to:
- during the recompilation of the static dictionary, store the first dynamic dictionary at least partly within the cache memory while storing the second dynamic dictionary in computer memory; and
- following the recompilation, store the second dynamic dictionary at least partly within the cache memory while storing the first dynamic dictionary in computer memory.

13. The apparatus according to claim 10, wherein the processors are further configured to, following the recompilation, rebuild the first dynamic dictionary, such that the first dynamic dictionary includes fewer keywords than the first dynamic dictionary previously included.

14. The apparatus according to claim 10, wherein the recompilation is a first recompilation, and wherein the processors are further configured to, following the first recompilation, add the keywords that arrived during the first recompilation to the static dictionary, by performing a second recompilation of the static dictionary.

15. The apparatus according to claim 14, wherein the processors are further configured to, during the second recompilation of the static dictionary:
- add any keywords that arrive during the second recompilation to the first dynamic dictionary and to the second dynamic dictionary; and
- search input data received via the network interface using both the second dynamic dictionary and the static dictionary.

16. The apparatus according to claim 10, wherein the processors are configured to add the keywords to a keyword collection, and to recompile the static dictionary such that the static dictionary includes all keywords contained in the keyword collection at a start of the recompilation.

17. The apparatus according to claim 10, wherein the processors are further configured to add to the second dynamic dictionary, but not to the first dynamic dictionary, any keywords that arrive following the recompilation and prior to a subsequent recompilation.

18. The apparatus according to claim 10, wherein the processors are configured to repeatedly add at least one respective newly-arrived keyword to the static dictionary, by repeatedly recompiling the static dictionary.

19. A computer software product comprising a tangible non-transitory computer-readable medium in which program instructions are stored, which instructions, when read by one or more processors, cause the processors to analyze communication traffic in a network to determine if keywords occur in the communication traffic and to:

during a recompilation of a static dictionary which is represented by a data structure stored in computer memory:
- receive one or more keywords during the recompilation;
- in response to beginning the recompilation of the static dictionary, transition a first dynamic dictionary to an active state from an inactive state and a second dynamic dictionary to a standby state from the active state, wherein each dynamic dictionary is represented by a respective data structure stored in the computer memory;
- add the one or more keywords to both the first dynamic dictionary and the second dynamic dictionary; and
- search input data using both the first dynamic dictionary and the static dictionary and not using the second dynamic dictionary while the first dynamic dictionary is in the active state and the second dynamic dictionary is in the standby state; and following the recompilation:
- in response to ending the recompilation of the static dictionary, transition the second dynamic dictionary to the active state from the standby state and the first dynamic dictionary to the inactive state from the active state; and
- search input data from the network using both the second dynamic dictionary and the static dictionary and not using the first dynamic dictionary while the first dynamic dictionary is in the inactive state and the second dynamic dictionary is in the active state.

20. The computer software product according to claim 19, wherein the first dynamic dictionary comprises a management automaton and a runtime automaton.

* * * * *